(12) United States Patent
Kamada et al.

(10) Patent No.: US 7,605,788 B2
(45) Date of Patent: Oct. 20, 2009

(54) METHOD OF DRIVING LIQUID CRYSTAL DISPLAY DEVICE AND LIQUID CRYSTAL DISPLAY DEVICE

(75) Inventors: Tsuyoshi Kamada, Kawasaki (JP);
Hidefumi Yoshida, Kawasaki (JP);
Masakazu Shibasaki, Kawasaki (JP);
Toshiaki Suzuki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 507 days.

(21) Appl. No.: 11/070,122

(22) Filed: Mar. 1, 2005

(65) Prior Publication Data

US 2006/0055648 A1    Mar. 16, 2006

(30) Foreign Application Priority Data

Sep. 16, 2004    (JP)    ............... 2004-270308

(51) Int. Cl.
*G09G 3/36* (2006.01)

(52) U.S. Cl. ............... 345/89; 345/90; 345/92; 345/94; 345/96

(58) Field of Classification Search ............ 345/87–98, 345/208–213, 204, 55, 589; 349/33, 43, 349/113, 187, 138, 37, 106; 359/290
See application file for complete search history.

(56) References Cited

U.S. PATENT DOCUMENTS

| | | | | |
|---|---|---|---|---|
| 4,388,655 A * | 6/1983 | Zenzefilis | ............... | 386/96 |
| 4,804,951 A * | 2/1989 | Yamashita et al. | ............... | 345/92 |
| 4,840,460 A | 6/1989 | Bernot et al. | | |
| 5,111,295 A * | 5/1992 | Chao | ............... | 348/443 |
| 5,122,790 A * | 6/1992 | Yasuda et al. | ............... | 345/96 |
| 5,126,865 A | 6/1992 | Sarma | | |
| 5,168,270 A * | 12/1992 | Masumori et al. | ............... | 345/100 |
| 5,196,925 A * | 3/1993 | Takanashi et al. | ............... | 348/206 |
| 5,552,911 A * | 9/1996 | Okada et al. | ............... | 349/106 |
| 5,654,733 A * | 8/1997 | Chimura et al. | ............... | 345/96 |
| 6,078,370 A * | 6/2000 | Wang et al. | ............... | 349/75 |
| 6,304,239 B1 * | 10/2001 | McKnight | ............... | 345/87 |
| 6,320,566 B1 * | 11/2001 | Go | ............... | 345/99 |
| 6,327,008 B1 * | 12/2001 | Fujiyoshi | ............... | 349/106 |
| 6,466,285 B1 * | 10/2002 | Ichikawa | ............... | 349/95 |
| 6,552,706 B1 * | 4/2003 | Ikeda et al. | ............... | 345/96 |
| 6,680,722 B1 * | 1/2004 | Hiraki et al. | ............... | 345/96 |
| 6,724,515 B1 * | 4/2004 | Kowarz | ............... | 359/290 |
| 6,734,840 B2 * | 5/2004 | Fukutoku et al. | ............... | 345/96 |
| 6,873,388 B2 * | 3/2005 | Tsukao et al. | ............... | 349/138 |
| 7,088,328 B2 * | 8/2006 | Inada et al. | ............... | 345/96 |
| 7,133,113 B2 * | 11/2006 | Tsukao et al. | ............... | 349/187 |

(Continued)

FOREIGN PATENT DOCUMENTS

JP    8-171369    7/1996

(Continued)

*Primary Examiner*—Prabodh M Dharia
(74) *Attorney, Agent, or Firm*—Greer, Burns & Crain, Ltd.

(57) ABSTRACT

A combination of a bright and dark display pattern and a polarity pattern is used to drive a liquid crystal display device. In the bright and dark display pattern, bright display picture elements and dark display picture elements alternate with each other every one picture element in horizontal and vertical directions. In the polarity pattern, positive-polarity picture elements and negative-polarity picture elements alternate with each other every two picture elements in the horizontal and vertical directions.

16 Claims, 22 Drawing Sheets

U.S. PATENT DOCUMENTS

| | | | |
|---|---|---|---|
| 7,212,259 B2* | 5/2007 | Hsu | 349/106 |
| 2001/0004253 A1* | 6/2001 | Fukutoku et al. | 345/96 |
| 2001/0026259 A1* | 10/2001 | McKnight | 345/95 |
| 2002/0003636 A1* | 1/2002 | Conner | 359/15 |
| 2002/0008812 A1* | 1/2002 | Conner et al. | 349/106 |
| 2002/0041263 A1* | 4/2002 | Aoki | 345/55 |
| 2002/0101433 A1* | 8/2002 | McKnight | 345/589 |
| 2002/0145602 A1* | 10/2002 | Matsueda | 345/213 |
| 2002/0149556 A1* | 10/2002 | Matsueda | 345/98 |
| 2003/1005837 * | 3/2003 | Takeda et al. | 349/33 |
| 2003/0090450 A1* | 5/2003 | Inada et al. | 345/87 |
| 2003/0156231 A1* | 8/2003 | Tsukao et al. | 349/43 |
| 2003/0169247 A1* | 9/2003 | Kawabe et al. | 345/204 |
| 2003/0169379 A1* | 9/2003 | Tsumura et al. | 349/42 |
| 2004/0021625 A1 | 2/2004 | Lee | |
| 2004/0027323 A1* | 2/2004 | Tanaka et al. | 345/98 |
| 2004/0041769 A1* | 3/2004 | Yamashita et al. | 345/93 |
| 2004/0070581 A1* | 4/2004 | Hiraki et al. | 345/209 |
| 2004/0075631 A1* | 4/2004 | Ishiguchi | 345/96 |
| 2004/0105050 A1* | 6/2004 | Hsu | 349/106 |
| 2004/0135755 A1* | 7/2004 | Hong | 345/89 |
| 2004/0257325 A1* | 12/2004 | Inoue | 345/89 |
| 2005/0140865 A1* | 6/2005 | Tsukao et al. | 349/113 |

FOREIGN PATENT DOCUMENTS

| | | |
|---|---|---|
| JP | 3076938 | 6/2000 |
| JP | 2001-75073 | 3/2001 |
| JP | 2003-337577 | 11/2003 |
| JP | 2004-302023 | 10/2004 |
| KR | 1999-0074551 | 10/1999 |

* cited by examiner

FIG. 9A
(PRIOR ART)

ODD-NUMBERED FRAME

|   | R | G | B | R | G | B | R | G | B | R | G | B |
|---|---|---|---|---|---|---|---|---|---|---|---|---|
| n   | + | − | + | − | + | − | + | − | + | − | + | − |
| n+1 | − | + | − | + | − | + | − | + | − | + | − | + |
| n+2 | + | − | + | − | + | − | + | − | + | − | + | − |
| n+3 | − | + | − | + | − | + | − | + | − | + | − | + |

FIG. 9B
(PRIOR ART)

EVEN-NUMBERED FRAME

|   | R | G | B | R | G | B | R | G | B | R | G | B |
|---|---|---|---|---|---|---|---|---|---|---|---|---|
| n   | − | + | − | + | − | + | − | + | − | + | − | + |
| n+1 | + | − | + | − | + | − | + | − | + | − | + | − |
| n+2 | − | + | − | + | − | + | − | + | − | + | − | + |
| n+3 | + | − | + | − | + | − | + | − | + | − | + | − |

FIG. 12A (PRIOR ART)
ODD-NUMBERED FRAME

FIG. 12B (PRIOR ART)
EVEN-NUMBERED FRAME

FIG. 12C (PRIOR ART)
ODD-NUMBERED FRAME

|   | R | G | B | R | G | B | R | G | B | R | G | B |
|---|---|---|---|---|---|---|---|---|---|---|---|---|
| n   | + | − | + | − | + | − | + | − | + | − | + | − |
| n+1 | − | + | − | + | − | + | − | + | − | + | − | + |
| n+2 | + | − | + | − | + | − | + | − | + | − | + | − |
| n+3 | − | + | − | + | − | + | − | + | − | + | − | + |

FIG. 12D (PRIOR ART)
EVEN-NUMBERED FRAME

|   | R | G | B | R | G | B | R | G | B | R | G | B |
|---|---|---|---|---|---|---|---|---|---|---|---|---|
| n   | − | + | − | + | − | + | − | + | − | + | − | + |
| n+1 | + | − | + | − | + | − | + | − | + | − | + | − |
| n+2 | − | + | − | + | − | + | − | + | − | + | − | + |
| n+3 | + | − | + | − | + | − | + | − | + | − | + | − |

FIG. 12E (PRIOR ART)
ODD-NUMBERED FRAME

FIG. 12F (PRIOR ART)
EVEN-NUMBERED FRAME

ODD-NUMBERED FRAME

EVEN-NUMBERED FRAME

ODD-NUMBERED FRAME

EVEN-NUMBERED FRAME

ODD-NUMBERED FRAME

EVEN-NUMBERED FRAME

FIG. 14A (PRIOR ART)
ODD-NUMBERED FRAME

FIG. 14B (PRIOR ART)
EVEN-NUMBERED FRAME

FIG. 14C (PRIOR ART)
ODD-NUMBERED FRAME

FIG. 14D (PRIOR ART)
EVEN-NUMBERED FRAME

FIG. 14E (PRIOR ART)
ODD-NUMBERED FRAME

FIG. 14F (PRIOR ART)
EVEN-NUMBERED FRAME

FIG. 18A
ODD-NUMBERED FRAME

FIG. 18B
EVEN-NUMBERED FRAME

FIG. 19A
(4m+1)TH FRAME

|       | R | G | B | R | G | B | R | G | B | R | G | B |
|-------|---|---|---|---|---|---|---|---|---|---|---|---|
| n     | + | + | − | − | + | + | − | − | + | + | − | − |
| n+1   | + | + | − | − | + | + | − | − | + | + | − | − |
| n+2   | − | − | + | + | − | − | + | + | − | − | + | + |
| n+3   | − | − | + | + | − | − | + | + | − | − | + | + |

FIG. 19B
(4m+2)TH FRAME

|       | R | G | B | R | G | B | R | G | B | R | G | B |
|-------|---|---|---|---|---|---|---|---|---|---|---|---|
| n     | + | + | − | − | + | + | − | − | + | + | − | − |
| n+1   | − | − | + | + | − | − | + | + | − | − | + | + |
| n+2   | − | − | + | + | − | − | + | + | − | − | + | + |
| n+3   | + | + | − | − | + | + | − | − | + | + | − | − |

FIG. 19C
(4m+3)TH FRAME

|       | R | G | B | R | G | B | R | G | B | R | G | B |
|-------|---|---|---|---|---|---|---|---|---|---|---|---|
| n     | − | − | + | + | − | − | + | + | − | − | + | + |
| n+1   | − | − | + | + | − | − | + | + | − | − | + | + |
| n+2   | + | + | − | − | + | + | − | − | + | + | − | − |
| n+3   | + | + | − | − | + | + | − | − | + | + | − | − |

FIG. 19D
(4m+4)TH FRAME

|       | R | G | B | R | G | B | R | G | B | R | G | B |
|-------|---|---|---|---|---|---|---|---|---|---|---|---|
| n     | − | − | + | + | − | − | + | + | − | − | + | + |
| n+1   | + | + | − | − | + | + | − | − | + | + | − | − |
| n+2   | + | + | − | − | + | + | − | − | + | + | − | − |
| n+3   | − | − | + | + | − | − | + | + | − | − | + | + |

FIG. 20A
(4m+1)TH FRAME

FIG. 20B
(4m+2)TH FRAME

FIG. 20C
(4m+3)TH FRAME

FIG. 20D
(4m+4)TH FRAME

METHOD OF DRIVING LIQUID CRYSTAL DISPLAY DEVICE AND LIQUID CRYSTAL DISPLAY DEVICE

CROSS-REFERENCE TO RELATED APLICATIONS

This application is based on and claims priority of Japanese Patent Application No. 2004-270308 filed on Sep. 16, 2004, the entire contents of which are incorporated herein by reference.

BACKGROUND OF THE INVENTION

1. Field of the Invention

The invention relates to a method of driving a liquid crystal display device and a liquid crystal display device, which are adapted to change, with time, the gray level of a display signal to be fed to each picture element of a liquid crystal display panel, thereby preventing the occurrence of a phenomenon in which an image as viewed from any oblique angle undergoes degradation in its color reproducibility, as compared to that as viewed from the front.

2. Description of the Prior Art

Liquid crystal display devices have the advantages of being thin and lightweight and also allowing low-voltage drive and thus low power consumption, as compared to CRTs (cathode ray tubes). Thus, liquid crystal display devices are used in various types of electronic equipment, such as televisions, notebook-sized PCs (personal computers), desktop PCs, PDAs (personal digital assistants), and mobile telephones. In particular, an active matrix liquid crystal display device, which includes a TFT (thin film transistor) which is provided for each picture element (or subpixel) so as to act as a switching element, has high driving capabilities and thus exhibits excellent display characteristics comparable to those of a CRT. Thus, active matrix liquid crystal display devices have come into wide use in the fields where CRTs have been heretofore used, such as desktop PCs and televisions.

As shown in FIG. 1, a liquid crystal display device generally comprises two transparent substrates 10 and 20 which are disposed with spacers 31 in between and are bonded with a sealing compound 32, and liquid crystal 30 sealed in between the substrates 10 and 20. One substrate 10 includes a picture element electrode and a TFT, which are provided for each picture element. The other substrate 20 includes a color filter to be faced with each picture element electrode, and a common electrode common to every picture element. The color filters are of three types: red (R), green (G), and blue (B). One color filter out of the three is laid over each picture element. A pixel is composed of three picture elements, that is, red (R), green (G) and blue (B) picture elements, which are located adjacent to each other.

Hereinafter, the substrate having the picture element electrodes and the TFTs will be called a "TFT substrate", and the substrate to be faced with the TFT substrate will be called an "opposite substrate". A structure formed of the TFT substrate, the opposite substrate, and liquid crystal sealed in between the substrates is herein referred to as a "liquid crystal display panel".

Typically, the TFT substrate 10 is larger than the opposite substrate 20 by the size of a connect terminal. Sheet polarizers 41 and 42 are disposed on both sides of a liquid crystal display panel 40 comprising the TFT substrate 10 and the opposite substrate 20. A backlight (not shown) is disposed under the liquid crystal display panel 40.

Heretofore, a TN (twisted nematic) liquid crystal display device has been widely used in which horizontal alignment liquid crystal (i.e., liquid crystal having positive anisotropy of dielectric constant) is sealed in between two substrates 10 and 20 so that liquid crystal molecules are oriented in a twisted fashion. However, the TN liquid crystal display device has the disadvantage of having poor viewing angle characteristics and thus causing considerable variations in the contrast or color tone of a screen as viewed from any oblique angle. Thus, MVA (multi-domain vertical alignment) liquid crystal display devices having good viewing angle characteristics are developed for practical use.

FIGS. 2A and 2B are schematic cross-sectional views showing an example of an MVA liquid crystal display device. The TFT substrate 10 and the opposite substrate 20 are disposed with spacers (not shown) in between, and vertical alignment liquid crystal 30 (i.e., liquid crystal having negative anisotropy of dielectric constant) is sealed in between the substrates 10 and 20. A plurality of bank-shaped projections 13 are formed on a picture element electrode 12 of the TFT substrate 10 so as to act as structures for defining domains. The surfaces of the picture element electrode 12 and the projections 13 are coated with a vertical alignment film 14 made of, for example, polyimide.

A plurality of bank-shaped projections 23 are also formed on a common electrode 22 of the opposite substrate 20 so as to act as structures for defining domains. The projections 23 are displaced obliquely relative to the projections 13 on the TFT substrate 10. The surfaces of the common electrode 22 and the projections 23 are also coated with a vertical alignment film 24 made of, for example, polyimide.

In the MVA liquid crystal display device, almost all liquid crystal molecules 30a are oriented perpendicularly to the substrate surfaces as shown in FIG. 2A, under conditions where no voltage is placed between the picture element electrode 12 and the common electrode 22. However, the liquid crystal molecules 30a near the projections 13 and 23 are oriented perpendicularly to the inclined surfaces of the projections 13 and 23.

When a predetermined voltage is placed between the picture element electrode 12 and the common electrode 22, the liquid crystal molecules 30a are oriented obliquely relative to the substrate surfaces under the effect of an electric field. In this instance, the liquid crystal molecules 30a are tilted in different directions on both sides of the projections 13 and 23 as shown in FIG. 2B, so that so-called multi-domain is achieved.

In the MVA liquid crystal display device, the liquid crystal molecules 30a are tilted in different directions on both sides of the projections 13 and 23 under the application of a voltage, as shown in FIG. 2B. This allows preventing light from leaking obliquely, thus achieving excellent viewing angle characteristics.

Although the description has been given with regard to the above-mentioned example in which the projections are used as the structures for defining domains, slits formed in the electrode or recesses (or grooves) formed in the substrate surface may be used as the structures for defining domains. Although the description has been given with reference to FIGS. 2A and 2B in which the structures for defining domains are formed on both the TFT substrate 10 and the opposite substrate 20, the structures for defining domains may be formed on one substrate, either the TFT substrate 10 or the opposite substrate 20.

FIG. 3 shows an example in which slits 12a are formed in the picture element electrode 12 on the TFT substrate 10 so as to act as structures for defining domains. Lines of electric force are generated obliquely toward the center of each slit 12a on the edges of each slit 12a, so that the liquid crystal molecules 30a are tilted in different directions on both sides of each slit 12a. This allows achieving multi-domain, thus improving viewing angle characteristics.

FIG. 4 is a plan view showing an example of an actual MVA liquid crystal display device. FIG. 4 shows one picture element region of the TFT substrate of the MVA liquid crystal display device.

A plurality of gate bus lines 51 extending horizontally and a plurality of data bus lines 55 extending vertically are disposed on the TFT substrate with respective predetermined pitches. The gate bus lines 51 and the data bus lines 55 partition the TFT substrate into rectangular regions, which are picture element regions. Auxiliary capacitance bus lines 52 are formed on the TFT substrate. The auxiliary capacitance bus lines 52 are disposed parallel to the gate bus lines 51 and cross the centers of the picture element regions. A first insulating film is formed between the gate bus lines 51 and auxiliary capacitance bus lines 52 and the data bus lines 55 so as to provide electrical isolation between the gate bus lines 51 and the data bus lines 55 and electrical isolation between the auxiliary capacitance bus lines 52 and the data bus lines 55.

A TFT 54, a picture element electrode 56, and an auxiliary capacitance electrode 53 are formed in each picture element region. The TFT 54 uses a part of the gate bus line 51 as a gate electrode. A drain electrode 54d of the TFT 54 is connected to the data bus line 55, and a source electrode 54s of the TFT 54 is located opposite to the drain electrode 54d with the gate bus line 51 in-between. The auxiliary capacitance electrode 53 is located opposite to the auxiliary capacitance bus line 52 with the first insulating film in-between.

The auxiliary capacitance electrode 53, the TFT 54, and the data bus line 55 are coated with a second insulating film, and the picture element electrode 56 is located on the second insulating film. The picture element electrode 56 is made of a transparent conductor such as ITO (Indium-Tin Oxide), and is electrically connected to the source electrode 54s of the TFT 54 and the auxiliary capacitance electrode 53 via contact holes 62a and 62b formed in the second insulating film. Two slits 56a extending obliquely are symmetrically formed in the picture element electrode 56. The surface of the picture element electrode 56 is coated with a vertical alignment film made of, for example, polyimide.

A black matrix, a color filter, and a common electrode are formed on the opposite substrate to be faced with the TFT substrate. Bank-shaped projections 71 extending parallel to the slits 56a are formed on the common electrode, as shown by the chain lines of FIG. 4. The projections 71 are displaced obliquely relative to the slits 56a in the picture element electrode 56. The surfaces of the common electrode and the projections 71 are coated with a vertical alignment film made of, for example, polyimide.

In the liquid crystal display device configured as mentioned above, placing a predetermined voltage between the picture element electrode 56 of the TFT substrate and the common electrode of the opposite substrate yields four domains having different orientations of liquid crystal molecules. The projections 71 and the slits 56a are used as the boundaries of the domains. This allows achieving good viewing angle characteristics.

Conventional MVA liquid crystal display devices exhibit better viewing angle characteristics than TN liquid crystal display devices. In the former, a phenomenon, however, occurs in which a screen becomes whitish when viewed from any oblique angle. FIG. 5 is a plot showing the transmittance (T) versus applied voltage (V) characteristics (hereinafter referred to simply as "T-V characteristics") of a screen as viewed from the front and as viewed at an oblique angle of 60 degrees from above. In FIG. 5, the horizontal and vertical axes indicate an applied voltage (V) and transmittance (T), respectively. As shown in FIG. 5, when slightly higher voltages than a threshold voltage are applied to a picture element electrode (as shown by the circled part in FIG. 5), the transmittance of the screen as viewed from the oblique angle is higher than the transmittance of the screen as viewed from the front. When relatively higher voltages are applied, the transmittance of the screen as viewed from the oblique angle is lower than the transmittance of the screen as viewed from the front. When the screen is viewed from the oblique angle, such low transmittance leads to small luminance differences among red, green and blue picture elements, thus resulting in the occurrence of the phenomenon in which the screen becomes whitish, as mentioned above. This phenomenon is called "washing out". Washing out occurs not only in MVA liquid crystal display devices, but also in TN liquid crystal display devices.

U.S. Pat. No. 4,840,460 presents the approach of subdividing each picture element into a plurality of sub picture elements and capacitively coupling the sub picture elements. In a liquid crystal display device adopting this approach, an electric potential is divided according to the capacitance ratio of each sub picture element, so that different voltages can be applied to the sub picture elements. Thus, a plurality of regions having T-V characteristics having different thresholds are apparently present in each picture element. The presence of a plurality of regions having T-V characteristics having different thresholds in each picture element, as mentioned above, allows preventing the occurrence of the phenomenon in which the transmittance of the screen as viewed from the oblique angle is higher than the transmittance of the screen as viewed from the front as shown in FIG. 5, thus preventing the occurrence of the phenomenon in which the screen becomes whitish (i.e., discoloring).

Japanese Patent No. 3076938 (Japanese Unexamined Patent Application Publication No. Hei 05-66412) discloses a liquid crystal display device including a picture element electrode which is subdivided into plural (e.g., four) sub picture element electrodes 81a to 81d, and control electrodes 82a to 82d which are disposed under the sub picture element electrodes 81a to 81d, respectively, with an insulating film in-between, as shown in FIG. 6. In the liquid crystal display device, the control electrodes 82a to 82d are of different sizes, and a display voltage is applied to each of the control electrodes 82a to 82d via a TFT 80. A control electrode 83 is also disposed between the adjacent electrodes of the sub picture element electrodes 81a to 81d in order to prevent light from leaking through between the adjacent electrodes of the sub picture element electrodes 81a to 81d.

The approach of subdividing each picture element into a plurality of capacitively coupled sub picture elements for the purpose of improving display characteristics, as disclosed in the above patents, is called "HT (halftone gray scale) technique based on capacitive coupling".

Japanese Unexamined Patent Application Publication No. 2001-75073 presents an approach for improving the viewing angle characteristics of a liquid crystal display device. For example, the approach involves applying a first voltage V1 to each picture element electrode for even-numbered frames, and applying a second voltage V2, which is about 0.5 to 1.5 V lower than the first voltage V1, to each picture element electrode for odd-numbered frames. Hereinafter, the application of the first voltage V1 to each picture element electrode will be called "bright display", and the application of the second voltage V2 lower than the first voltage V1 will be called "dark display". A pattern indicating the arrangement of bright display picture elements and dark display picture elements is herein referred to as a "bright and dark display pattern".

The publication No. 2001-75073 presents a description as given below. For the odd-numbered frames, all picture elements undergo dark display as shown in FIG. 7A. For the even-numbered frames, all picture elements undergo bright display as shown in FIG. 7B. This publication also presents a description as given below. For the odd-numbered frames, picture elements connected to odd-numbered (e.g., the nth, (n+2)th, . . .) gate bus lines may undergo dark display, and picture elements connected to even-numbered (e.g., the (n+1) th, (n+3)th, . . .) gate bus lines may undergo bright display, as shown in FIG. 8A. For the even-numbered frames, the picture elements connected to the odd-numbered gate bus lines may undergo bright display, and the picture elements connected to the even-numbered gate bus lines may undergo dark display, as shown in FIG. 8B. In FIGS. 7A and 7B and FIGS. 8A and 8B, R, G and B denote red (R), green (G) and blue (B) picture elements, respectively.

The HT technique based on capacitive coupling, as mentioned above, uses the approach (i.e., space division) of subdividing each picture element into a plurality of regions and applying different voltages to the regions for the purpose of improving viewing angle characteristics, whereas the liquid crystal display device disclosed in the publication No. 2001-75073 adopts the approach of changing, with time, a voltage to be applied to each picture element electrode for the purpose of achieving the effect of the HT technique. Hereinafter, this approach will be called "HT technique based on time division".

In order to prevent burn-in, liquid crystal display devices are typically adapted to change the polarity of a voltage (or a display signal) to be applied to each picture element electrode for each frame. In this case, transmittance under the application of a positive-polarity (or plus) voltage is slightly different from transmittance under the application of a negative-polarity (or minus) voltage. Thus, flicker occurs, for example when a voltage of positive polarity and a voltage of negative polarity are applied to all picture elements for odd-numbered frames and even-numbered frames, respectively. Thus, liquid crystal display devices are typically adapted to apply voltages of different polarities to picture elements located horizontally and vertically adjacent to each other and are further adapted to change the polarity of a voltage to be applied to each picture element for each frame, as shown in FIGS. 9A and 9B.

Hereinafter, a pattern indicating the polarity of a voltage to be applied to each picture element, as shown in each of FIGS. 9A and 9B, will be called a "polarity pattern". The polarity pattern in which voltages of different polarities are applied to a horizontal arrangement of picture elements every one picture element and voltages of different polarities are applied to a vertical arrangement of picture elements every one picture element, for example as shown in each of FIGS. 9A and 9B, is herein referred to as a "polarity pattern with transverse 1-dot inversion and longitudinal 1-dot inversion".

Japanese Unexamined Patent Application Publication No. Hei 08-171369 presents the approach of applying, by turns, voltages of different polarities to adjacent data bus lines for the purpose of reducing poor display, such as a transverse (or horizontal) luminance gradient, transverse crosstalk, and a longitudinal (or vertical) luminance gradient.

Japanese Unexamined Patent Application Publication No. 2003-337577 presents a liquid crystal display device which is adapted to select between a 1-dot inversion polarity pattern in which the polarity is reversed every one picture element and a 2-dot inversion polarity pattern in which the polarity is reversed every two picture elements, for example according to vertical frequencies and the presence or absence of flicker.

The HT technique based on capacitive coupling has the disadvantage of reducing an aperture ratio and thus providing insufficient brightness, because a voltage to be applied to each sub picture element electrode cannot be used to provide a desired orientation of liquid crystal molecules in a region between the sub picture element electrodes. This HT technique also has the disadvantage of increasing the likelihood of a short circuit occurring between the sub picture element electrodes and the control electrodes or between adjacent sub picture element electrodes, because of requiring a thin insulating film between the control electrodes and the picture element electrodes or a slit of narrow width between the sub picture element electrodes.

The HT technique based on time division, as disclosed in the above publication No. 2001-75073, does not have these disadvantages. However, experimental tests and research carried out by the inventors have shown that the technique disclosed in the publication No. 2001-75073, as applied to MVA liquid crystal display devices, cannot achieve its full effect.

Specifically, the publication No. 2001-75073 gives the definition of the voltage V1 as the voltage which provides desired brightness when the voltage V1 alone is applied to each picture element electrode, and gives the definition of the voltage V2 as the voltage which is lower than the voltage V1 by a predetermined value (e.g., about 0.5 to 1.5 V). Brightness under the application of these different voltages V1 and V2 alternating with each other to each picture element electrode should be lower than brightness under the application of the voltage V1 alone. In the publication No. 2001-75073, the brightness under the application of the voltages V1 and V2 alternating with each other to each picture element electrode is considered to be substantially the same as the brightness under the application of the voltage V1 alone to each picture element electrode, because there is little difference between the brightness under the application of the voltage V1 to each picture element electrode and the brightness under the application of the voltage V2 to each picture element electrode.

FIG. 10 is a plot showing the relation between a gray level difference between the voltages V1 and V2 for halftone display (127/255) and brightness as viewed from any oblique angle. In FIG. 10, the horizontal and vertical axes indicate the gray level difference between the voltages V1 and V2 and the brightness as viewed from any oblique angle, respectively. Generally, such a gray level difference that a luminance difference is unnoticeable, as described in the publication No. 2001-75073, lies between about 1/255 and 4/255. When the gray level difference falls outside this range, the luminance difference is fully recognizable. However, a gray level difference of about 1/255 to 4/255 causes little change in brightness, as can be seen from FIG. 10. A difference of at least 96-level or more gray scale must be set in order to achieve a sufficiently great reduction in the brightness as viewed from any oblique angle, while maintaining brightness as viewed from the front. In other words, the HT technique based on time division cannot achieve its effect and thus improve viewing angle characteristics, when the difference between the voltages V1 and V2 is such that the luminance difference is unnoticeable as described in the publication No. 2001-75073.

In order that the HT technique based on time division may fully achieve the effect of improving viewing angle characteristics, the brightness under the application of the voltage V1 and the brightness under the application of the voltage V2 must be higher and lower than desired brightness, respectively, so as to increase the luminance difference between the voltages V1 and V2.

FIG. 11 is a plot showing the input gray level versus output gray level characteristics of the voltages V1 and V2 required to obtain desired brightness. In FIG. 11, the horizontal and vertical axes indicate the input gray level and the output gray level, respectively. For example in order that the output gray level will be 125/255, the input gray level for the voltage V1 and the input gray level for the voltage V2 must be set to 225/255 and 100/255, respectively, so as to produce a difference of as much as 125-level gray scale. Such a large difference between the voltages V1 and V2 causes a severe flicker in full screen, when the bright and dark display patterns shown in FIGS. 7A and 7B are used to drive the liquid crystal display panel. This large difference causes severe flickers in the form of transversely extending lines, when the bright and dark display patterns shown in FIGS. 8A and 8B are used to drive the liquid crystal display panel.

In short, the technique disclosed in the publication No. 2001-75073 has at least three problems as given below:
(1) an input signal does not match output brightness;
(2) the technique does not achieve the effect of improving viewing angle characteristics, when there is little gray level difference; and
(3) the bright and dark display pattern is noticeable, when there is a large gray level difference.

Japanese Patent Application No. 2003-93793 filed by the applicant gives a description with regard to the approach of applying, by turns, the voltages V1 and V2 to picture elements located horizontally and vertically adjacent to each other, as shown in FIGS. 12A and 12B. Bright and dark display patterns shown in FIGS. 12A and 12B (e.g., bright and dark display patterns with transverse 1-dot inversion and longitudinal 1-dot inversion) are combined with polarity patterns shown in FIGS. 12C and 12D (e.g., polarity patterns with transverse 1-dot inversion and longitudinal 1-dot inversion) to form patterns shown in FIGS. 12E and 12F, respectively. Specifically, dark display picture elements alternate with bright display picture elements in horizontal and vertical directions, and moreover, picture elements to be subjected to a voltage of positive polarity alternate with picture elements to be subjected to a voltage of negative polarity in the horizontal and vertical directions.

In this case, the negative-polarity voltage alone and the positive-polarity voltage alone, however, are applied to the bright display picture elements and the dark display picture elements, respectively, as can be seen from FIGS. 12E and 12F. This leads to the application of a direct-current component to a liquid crystal layer, and thus results in the occurrence of burn-in or flicker.

The application No. 2003-93793 also gives a description with regard to the approach of using polarity patterns shown in FIGS. 13C and 13D (e.g., polarity patterns with transverse 1-dot inversion and longitudinal 2-dot inversion) to drive the liquid crystal display panel. The polarity patterns shown in FIGS. 13C and 13D are combined with bright and dark display patterns shown in FIGS. 13A and 13B (e.g., bright and dark display patterns with transverse 1-dot inversion and longitudinal 1-dot inversion) to form patterns shown in FIGS. 13E and 13F, respectively. Specifically, bright display picture elements alternate with dark display picture elements in the horizontal and vertical directions. Moreover, picture elements to be subjected to a positive-polarity voltage and picture elements to be subjected to a negative-polarity voltage alternate with each other in the horizontal direction, and are arranged in the vertical direction so that the polarity changes every two picture elements.

In this case, however, only the voltage of one polarity (i.e., positive or negative polarity) is applied to the bright display picture elements of the horizontally arranged picture elements, and only the voltage of the other polarity (i.e., negative or positive polarity) is applied to the dark display picture elements thereof, as can be seen from FIGS. 13E and 13F.

The picture element electrodes of the horizontally arranged picture elements are connected to one and the same gate bus line via TFTs, and are capacitively coupled to one and the same auxiliary capacitance bus line to form auxiliary capacitance. Thus, a considerable imbalance in electric potential in the picture elements connected to one gate bus line, as shown in FIGS. 13E and 13F, causes variations in the electric potentials of the gate bus line and the auxiliary capacitance bus line. This causes flicker in each transverse line.

The above application No. 2003-93793 also presents the approach of using combinations of bright and dark display patterns shown in FIGS. 14A and 14B (e.g., bright and dark display patterns with transverse 2-dot inversion and longitudinal 1-dot inversion) and polarity patterns shown in FIGS. 14C and 14D (e.g., polarity patterns with transverse 1-dot inversion and longitudinal 2-dot inversion) for driving as shown in FIGS. 14E and 14F. As can be seen from FIGS. 14E and 14F, this approach achieves a spatial balance between bright display and dark display and a spatial balance between a positive polarity and a negative polarity. From the viewpoint of each picture element, this approach also changes the display state for each frame so that the picture element undergoes positive-polarity dark display, then positive-polarity bright display, then negative-polarity dark display, and then negative-polarity bright display. Therefore, this approach can prevent the occurrence of burn-in or flicker.

However, the approach shown in FIGS. 14A to 14F has the disadvantage of producing a coarse screen, because of changing bright display and dark display every two horizontal picture elements.

SUMMARY OF THE INVENTION

It is therefore an object of the invention to provide a method of driving a liquid crystal display device and a liquid crystal display device, which are adapted to reduce oblique leakage of light, and to achieve far superior display quality to the prior-art methods and devices.

To achieve the above object, there is provided a method of driving a liquid crystal display device including a plurality of picture elements arranged in horizontal and vertical directions, and a display signal feeding part which receives input of a video signal and feeds a display signal to each of the plurality of picture elements, wherein the display signal feeding part determines the gray level and polarity of a display signal to be fed to each picture element in accordance with a bright and dark display pattern and a polarity pattern; the bright and dark display pattern indicates the arrangement of bright display picture elements, each of which undergoes bright display through the supply of a first display signal having a higher gray level than the gray level of the video signal, and dark display picture elements, each of which undergoes dark display through the supply of a second display signal having a lower gray level than the gray level of the video signal; and the polarity pattern indicates the arrangement of positive-polarity picture elements, each of which receives the supply of a display signal of positive polarity, and negative-polarity picture elements, each of which receives the supply of a display signal of negative polarity; in the bright and dark display pattern, the bright display picture elements and the dark display picture elements alternate with each other every one picture element in the horizontal and vertical directions; and in the polarity pattern, the positive-polarity picture elements and the negative-polarity picture elements alternate with each other every (2×n) picture elements in the horizontal and vertical directions (where n denotes any integer exceeding 0 (n>0)).

In the invention, a combination of the bright and dark display pattern and the polarity pattern is used to drive the liquid crystal display device. In the bright and dark display pattern, the bright display picture elements and the dark display picture elements alternate with each other every one picture element in the horizontal and vertical directions. In the polarity pattern, the positive-polarity picture elements and the negative-polarity picture elements alternate with each other for example every two picture elements in the horizontal and vertical directions. The driving method of the invention, as mentioned above, allows what the effect of HT technique based on time division is aiming at, that is, preventing a phenomenon in which a screen becomes whitish when viewed from any oblique angle (i.e., washing out), while preventing the occurrence of flicker and burn-in on the screen. Moreover, the driving method enables coarseness-free excellent display, because the bright display picture elements and the dark display picture elements alternate with each other every one picture element.

In the invention, the liquid crystal display device receives input of a video signal from an apparatus such as a computer, which outputs the video signal. Then, the first display signal having a higher gray level than the gray level of the video signal is fed to each of the bright display picture elements, and the second display signal having a lower gray level than the gray level of the video signal is fed to each of the dark display picture elements. Thus, the driving method of the invention can improve the gray level of the video signal.

To achieve the above object, there is provided a liquid crystal display device which includes a liquid crystal display panel having an arrangement of a plurality of picture elements; a plurality of gate bus lines and a plurality of data bus lines, which are disposed on the liquid crystal display panel and are connected to the picture elements; a display controller which receives input of a video signal and outputs a display signal; a gate driver which feeds a scan signal to the plurality of gate bus lines in sequence; a first data driver which feeds a display signal to odd-numbered data bus lines; and a second data driver which feeds a display signal to even-numbered data bus lines; wherein the display controller feeds display signals, which have different polarities every two picture elements and have different gray levels every one picture element, to the plurality of picture elements through the first and second data drivers.

To achieve the above object, there is provided a liquid crystal display device which includes a liquid crystal display panel having an arrangement of a plurality of picture elements; a plurality of gate bus lines and a plurality of data bus lines, which are disposed on the liquid crystal display panel and are connected to the picture elements; a display controller which receives input of a video signal and outputs a display signal; a gate driver which feeds a scan signal to the plurality of gate bus lines in sequence; a data driver which feeds a display signal to the plurality of data bus lines; and a wiring replacement part which feeds signals, which are outputted through the (4k+1)th, (4k+2)th, (4k+3)th, and (4k+4)th output terminals of the data driver, to the (4k+1)th, (4k+3)th, (4k+2)th, and (4k+4)th data bus lines, respectively (where k denotes any natural number including 0).

Currently, almost all of driver ICs (integrated circuits) in general use are adapted either to apply voltages of opposite polarities to adjacent data bus lines or to apply a voltage of the same polarity to all data bus lines. In the invention, two data drivers are used. One data driver is used to control the polarity of a display signal to be fed to an odd-numbered data bus line, and the other data driver is used to control the polarity of a display signal to be fed to an even-numbered data bus line. The above-described driving method, which is implemented by using these data drivers to control the polarity of the display signal, permits the use of any general-purpose driver IC, thus avoiding a rise in the cost of manufacturing the liquid crystal display device.

Moreover, the liquid crystal display device includes the wiring replacement part which feeds signals, which are outputted through the (4k+1)th, (4k+2)th, (4k+3)th, and (4k+4)th output terminals of the data driver, to the (4k+1)th, (4k+3)th, (4k+2)th, and (4k+4)th data bus lines, respectively. This permits the use of any general-purpose driver IC, thus avoiding a rise in the cost of manufacturing the liquid crystal display device.

BRIEF DESCRIPTION OF THE DRAWINGS

FIGS. 9A and 9B are illustrations showing still another example of the conventional method of driving a liquid crystal display device;

FIGS. 12A to 12F are illustrations showing a further example of the conventional method of driving a liquid crystal display device;

FIGS. 14A to 14F are illustrations showing a further example of the conventional method of driving a liquid crystal display device;

FIGS. 18A and 18B illustrate bright and dark display patterns for odd-numbered and even-numbered frames, respectively;

FIGS. 19A, 19B, 19C, and 19D illustrate polarity patterns for the (4m+1)th, (4m+2)th, (4m+3)th, and (4m+4)th frames, respectively;

FIGS. 20A, 20B, 20C, and 20D illustrate bright and dark display patterns combined with the polarity patterns for the (4m+1)th, (4m+2)th, (4m+3)th, and (4m+4)th frames, respectively;

DESCRIPTION OF THE PREFERRED EMBODIMENTS

Embodiments of the invention will be described below with reference to the drawings.

[General Configuration of Liquid Crystal Display Device]

Figure 15:
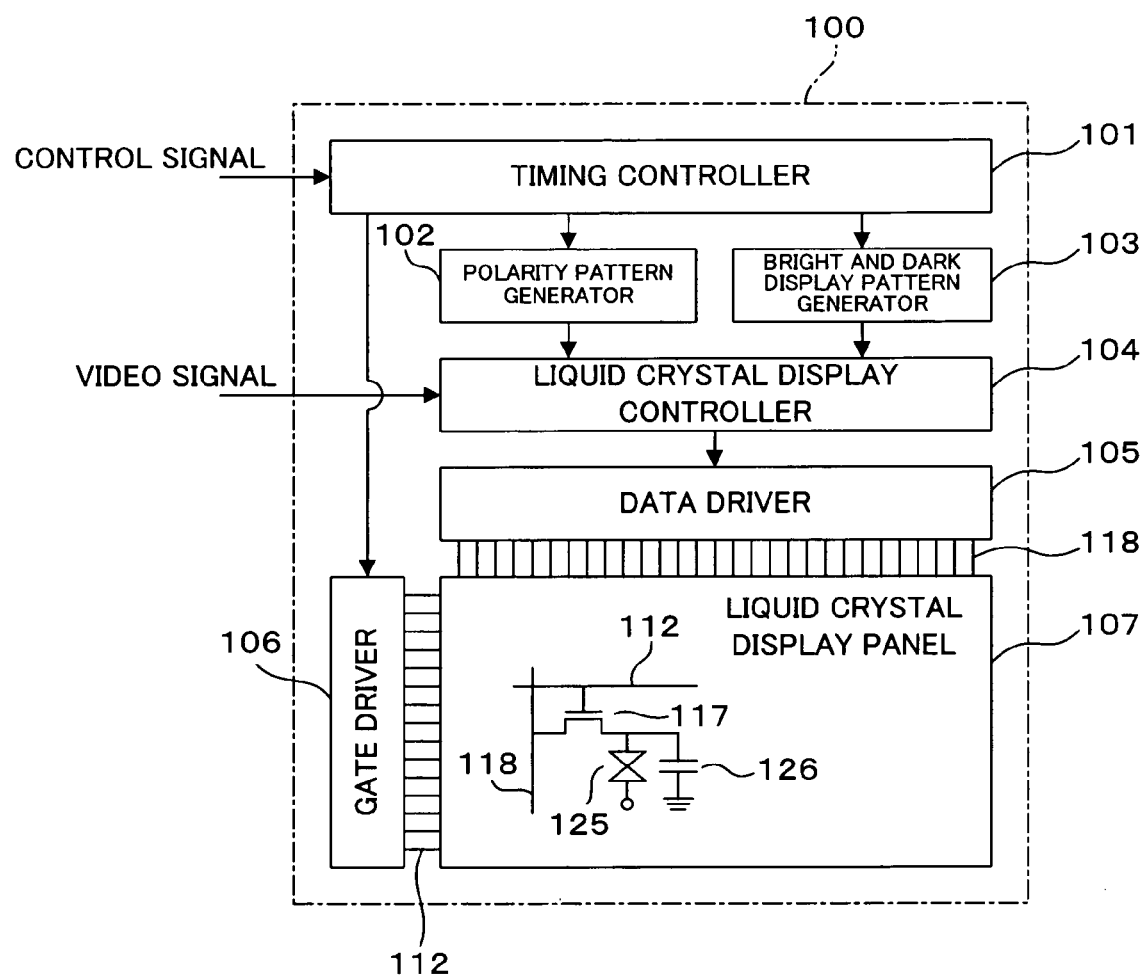
FIG. 15 is a block diagram showing the configuration of a liquid crystal display device according to an embodiment of the invention.

FIG. 15 is a block diagram showing the configuration of a liquid crystal display device according to an embodiment of the invention.

A liquid crystal display device 100 of the embodiment comprises a timing controller 101, a polarity pattern generator 102, a bright and dark display pattern generator 103, a liquid crystal display controller 104, a data driver 105, a gate driver 106, and a liquid crystal display panel 107. The liquid crystal display device 100 receives input of a video signal and a control signal from an external apparatus (not shown) such as a personal computer.

The liquid crystal display panel 107 has a matrix of a plurality of picture elements. Each picture element comprises a TFT (thin film transistor) 117, and a display cell 125 (or a liquid crystal cell) and an auxiliary capacitor 126 which are connected to a source electrode of the TFT 117. The display cell 125 comprises a picture element electrode, a common electrode, liquid crystal between the electrodes, and a pair of sheet polarizers, which will be described later. The auxiliary capacitor 126 comprises an auxiliary capacitance bus line, an auxiliary capacitance electrode, and an insulating film between them, which will be described later.

A plurality of gate bus lines 112 extending horizontally and a plurality of data bus lines 118 extending vertically are disposed on the liquid crystal display panel 107. Gate electrodes of the TFTs 117 of a horizontal arrangement of picture elements are connected to one and the same gate bus line 112. Drain electrodes of the TFTs 117 of a vertical arrangement of picture elements are connected to one and the same data bus line 118.

Upon receipt of input of the control signal from the external apparatus, the timing controller 101 generates a timing signal for polarity pattern generation, a timing signal for bright and dark display pattern generation, and a timing signal for gate driver in accordance with the control signal. The timing controller 101 outputs the timing signals to the polarity pattern generator 102, the bright and dark display pattern generator 103, and the gate driver 106.

Upon receipt of input of the timing signal from the timing controller 101, the polarity pattern generator 102 generates a signal indicative of a polarity pattern (to be described later) in accordance with the timing signal. The polarity pattern generator 102 outputs the generated signal to the liquid crystal display controller 104. Upon receipt of input of the timing signal from the timing controller 101, the bright and dark display pattern generator 103 generates a signal indicative of a bright and dark display pattern (to be described later) in accordance with the timing signal. The bright and dark display pattern generator 103 outputs the generated signal to the liquid crystal display controller 104.

Upon receipt of input of the video signal from the external apparatus, the liquid crystal display controller 104 outputs a display signal to the data driver 105. In this case, the liquid crystal display controller 104 determines the voltage and polarity of the display signal for each data bus line 118 in accordance with the video signal and the input signals from the polarity pattern generator 102 and the bright and dark display pattern generator 103.

Upon receipt of input of the digital display signal from the liquid crystal display controller 104, the data driver 105 converts the digital display signal into an analog display signal. The data driver 105 outputs the analog display signal to each data bus line 118 in accordance with predetermined timing.

Upon receipt of input of the timing signal from the timing controller 101, the gate driver 106 outputs a scan signal to the gate bus lines 112 in sequence within a vertical synchronization interval in accordance with the timing signal. When the gate bus line 112 receives the scan signal, the TFT 117 connected to the gate bus line 112 is turned on, so that the display signal fed to the data bus line 118 is written in the display cell 125. Thus, liquid crystal molecules of the display cell 125 are tilted at an angle according to the display signal, so that the light transmittance of the display cell 125 is changed. The control of light transmittance for each display cell 125 makes it possible to display a desired image on the liquid crystal display panel 107.

[Liquid Crystal Display Panel]

Figure 16:
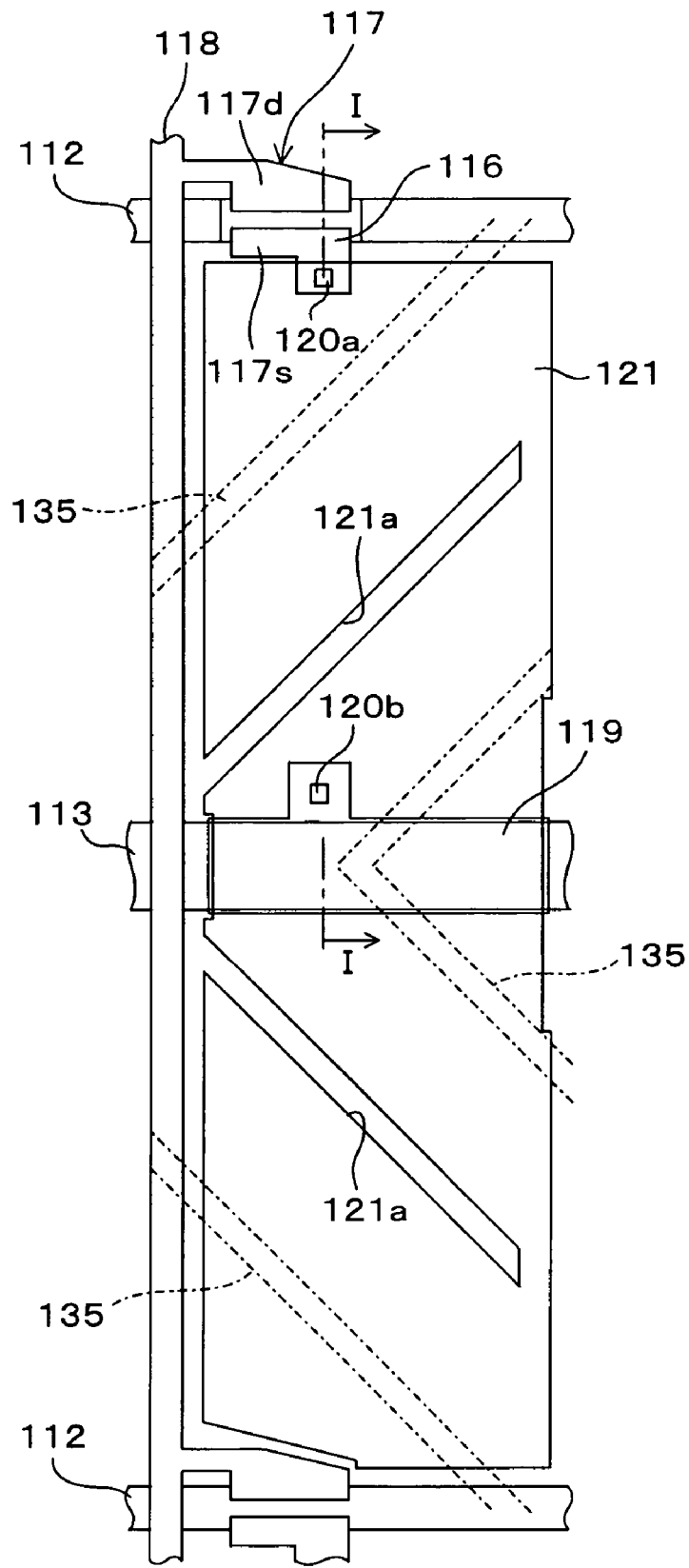
FIG. 16 is a plan view showing one picture element region of a liquid crystal display panel of the embodiment.
Figure 17:
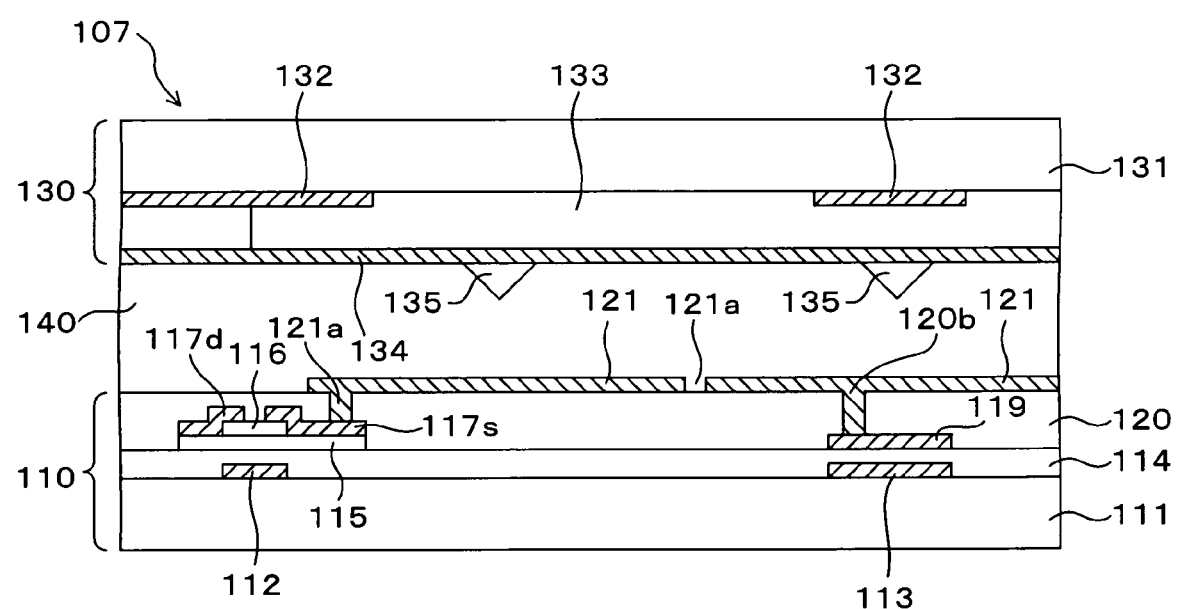
FIG. 17 is a schematic cross-sectional view taken along the line I-I of FIG. 16.

FIG. 16 is a plan view showing a picture element of the liquid crystal display panel 107. FIG. 17 is a schematic cross-sectional view taken along the line I-I of FIG. 16.

As shown in FIGS. 16 and 17, the liquid crystal display panel 107 comprises a TFT substrate 110, an opposite substrate 130, and vertical alignment liquid crystal 140 (i.e., liquid crystal having negative anisotropy of dielectric constant) sealed in between the TFT substrate 110 and the opposite substrate 130.

A plurality of gate bus lines 112 extending horizontally (i.e., along the X-axis) and a plurality of data bus lines 118 extending vertically (i.e., along the Y-axis), as mentioned above, are disposed on a glass substrate 111 which forms a base of the TFT substrate 110. The gate bus lines 112 and the data bus lines 118 partition the glass substrate 111 into rectangular regions, which are picture element regions. Auxiliary capacitance bus lines 113, which are disposed parallel to the gate bus lines 112 and cross the picture element regions, are formed on the glass substrate 111.

A TFT 117, a picture element electrode 121 made of a transparent conductor such as ITO (Indium-Tin Oxide), and an auxiliary capacitance electrode 119 are formed in each picture element region. In the embodiment, the TFT 117 uses a part of the gate bus line 112 as a gate electrode. A drain electrode 117d of the TFT 117 is connected to the data bus line 118, and a source electrode 117s of the TFT 117 is located opposite to the drain electrode 117d with the gate bus line 112 in-between.

The picture element electrode 121 is electrically connected to the source electrode 117s of the TFT 117 and the auxiliary capacitance electrode 119 via contact holes 120a and 120b. Slits 121a extending obliquely are symmetrically formed in the picture element electrode 121 so as to act as structures for defining domains. Bank-shaped projections 135 made of a dielectric resin or the like are formed on the opposite substrate 130 so as to act as structures for defining domains.

The description will be given below with reference to FIG. 17 with regard to the laminar structure of the TFT substrate 110 and the opposite substrate 130.

The gate bus line 112 and the auxiliary capacitance bus line 113 are formed on the glass substrate 111 which forms the base of the TFT substrate 110. A metal film (or a first metal film), such as a Cr (chromium) film or an Al-Ti film having a stacked structure comprising Al (aluminum) and Ti (titanium), is subjected to patterning using photolithography to form the gate bus line 112 and the auxiliary capacitance bus line 113.

The gate bus line 112 and the auxiliary capacitance bus line 113 are coated with a first insulating film 114 (or a gate insulating film) which is formed on the glass substrate 111 and made of $SiO_2$, SiN, or the like. A silicon film 115 (e.g., an amorphous silicon film or a polycrystalline silicon film), which forms an active layer of the TFT 117, is formed on the first insulating film 114 in a predetermined region.

A channel protective film 116 made of SiN or the like is formed on the silicon film 115. The source electrode 117s and the drain electrode 117d of the TFT 117 are formed on both sides of the channel protective film 116. The drain electrode 117d is connected to the data bus line 118, as mentioned above. The auxiliary capacitance electrode 119 is formed opposite to the auxiliary capacitance bus line 113 with the first insulating film 114 in-between. A metal film (or a second metal film) having a three-layer Ti—Al—Ti structure, for example, is subjected to patterning using photolithography to form the source electrode 117s, the drain electrode 117d, the data bus line 118, and the auxiliary capacitance electrode 119.

The source electrode 117s, the drain electrode 117d, the data bus line 118, and the auxiliary capacitance electrode 119 are coated with a second insulating film 120 made of $SiO_2$, SiN, or the like. The picture element electrode 121 is formed on the second insulating film 120. The slits 121a extending obliquely are formed in the picture element electrode 121 so as to act as the structures for defining domains, as mentioned above. The picture element electrode 121 is electrically connected to the source electrode 117s and the auxiliary capacitance electrode 119 via the contact holes 120a and 120b formed in the second insulating film 120.

A transparent conductor film made of ITO or the like is formed on the second insulating film 120 and then subjected to patterning using photolithography to form the picture element electrode 121. The surface of the picture element electrode 121 is coated with a vertical alignment film (not shown) made of polyimide or the like.

A black matrix 132 (or a light shield film), a color filter 133, a common electrode 134, and a bank-shaped projection 135 for defining domains are formed on one surface (e.g., a bottom surface as shown in FIG. 17) of a glass substrate 131 which forms a base of the opposite substrate 130.

The black matrix 132 is located opposite to the gate bus line 112, the data bus line 118, the auxiliary capacitance bus line 113, and the TFT 117 on the TFT substrate 110. The color filters 133 are of three types: red, green, and blue. Either the red, green or blue color filter is provided for each picture element region. A pixel is composed of three picture elements, namely, red, green and blue picture elements, which are located adjacent to each other. This makes it possible to display various colors.

The common electrode 134 is made of a transparent conductor such as ITO and is formed on the color filter 133 (e.g., a bottom surface thereof as shown in FIG. 17). The bank-shaped projections 135 made of a dielectric resin or the like are formed on the common electrode 134 (e.g., a bottom surface thereof as shown in FIG. 17) so as to act as the structures for defining domains, as mentioned above. As shown in FIG. 16, the projections 135 are displaced obliquely relative to the slits 121a in the picture element electrode 121 on the TFT substrate 110. The surfaces of the common electrode 134 and the projections 135 are coated with a vertical alignment film (not shown) made of polyimide or the like.

Although not shown in FIG. 17, a first sheet polarizer and a backlight are disposed on a bottom surface of the TFT substrate 110, and a second sheet polarizer is disposed on a top surface of the opposite substrate 130.

[Driving Method]

FIGS. 18A and 18B illustrate bright and dark display patterns for odd-numbered and even-numbered frames, respectively. FIGS. 19A, 19B, 19C, and 19D illustrate polarity patterns for the (4m+1)th, (4m+2)th, (4m+3)th, and (4m+4)th frames, respectively (where m denotes any natural number including 0). FIGS. 20A, 20B, 20C, and 20D illustrate bright and dark display patterns combined with the polarity patterns for the (4m+1)th, (4m+2)th, (4m+3)th, and (4m+4)th frames, respectively.

In the embodiment, a combination of a bright and dark display pattern with transverse 1-dot inversion and longitudinal 1-dot inversion and a polarity pattern with transverse 2-dot inversion and longitudinal 2-dot inversion is used to drive the liquid crystal display panel 107, as shown in FIGS. 18A and 18B and FIGS. 19A to 19D. Specifically, bright display picture elements alternate with dark display picture elements in the horizontal and vertical directions, and moreover, picture elements of positive polarity and picture elements of negative polarity are arranged in the horizontal and vertical directions so that the polarity changes every two picture elements. As shown in FIGS. 20A to 20D, the combination of the bright and dark display pattern and the polarity pattern is changed for each frame, and a cycle is composed of four frames.

The voltage of a display signal to be fed to each bright display picture element is set so that the gray level of the display signal is higher than the gray level of a video signal from the external apparatus. The voltage of a display signal to be fed to each dark display picture element is set so that the gray level of the display signal is lower than the gray level of the video signal. It should be noted that bright display and dark display must alternate with each other so that the substantial gray level is equal to the gray level of the video signal. In the embodiment, a gray level difference between bright display and dark display is set according to the gray level of the video signal (or input signal), for example as shown in FIG. 11.

When the liquid crystal display panel 107 is driven in this manner, the bright display picture elements alternate with the dark display picture elements as shown in FIGS. 20A to 20D. Thus, visual recognition cannot be made to distinguish between the bright display picture elements and the dark display picture elements, so that a coarse screen is avoided. Moreover, the positive-polarity dark display picture element, the positive-polarity bright display picture element, the negative-polarity dark display picture element, and the negative-polarity bright display picture element are arranged in sequence in the horizontal and vertical directions, and therefore, flicker is avoided from occurring in each line and on the overall liquid crystal display panel.

Furthermore, from the viewpoint of each picture element, the display state is changed for each frame so that the picture element undergoes positive-polarity dark display, then positive-polarity bright display, then negative-polarity dark display, and then negative-polarity bright display. This prevents a direct-current component from remaining in the liquid crystal, thus avoiding the occurrence of burn-in.

Figure 1:
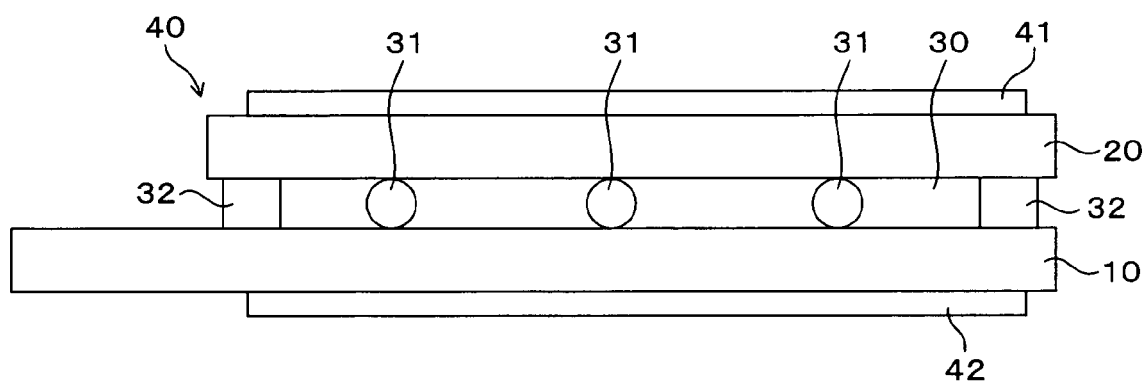
FIG. 1 is a schematic illustration showing a configuration of a conventional liquid crystal display device.
Figure 2A:
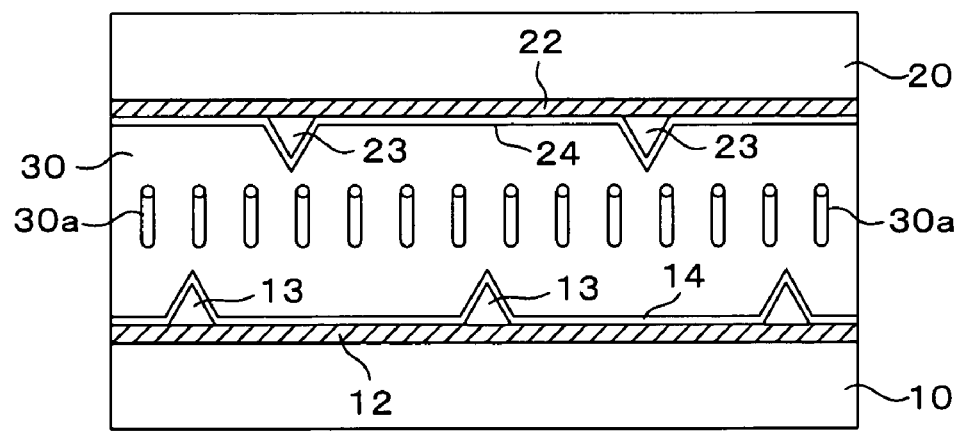
FIGS. 2A and 2B are schematic cross-sectional views showing an example of an MVA liquid crystal display device.
Figure 2B:
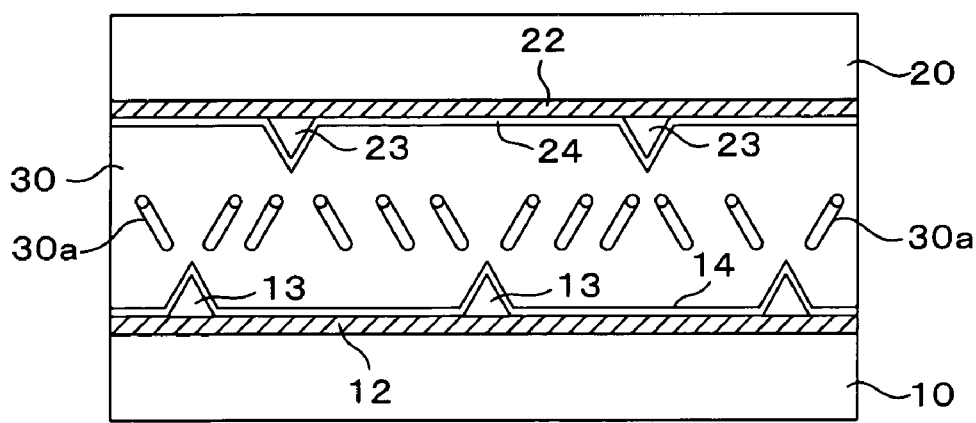
Figure 3:
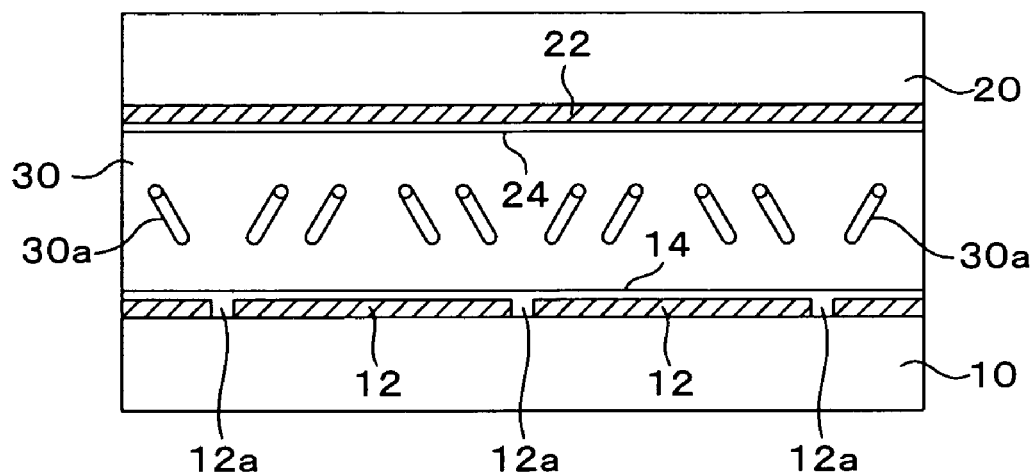
FIG. 3 is a schematic cross-sectional view showing an example of a liquid crystal display device in which slits are formed in a picture element electrode on a TFT substrate so as to act as structures for defining domains.
Figure 4:
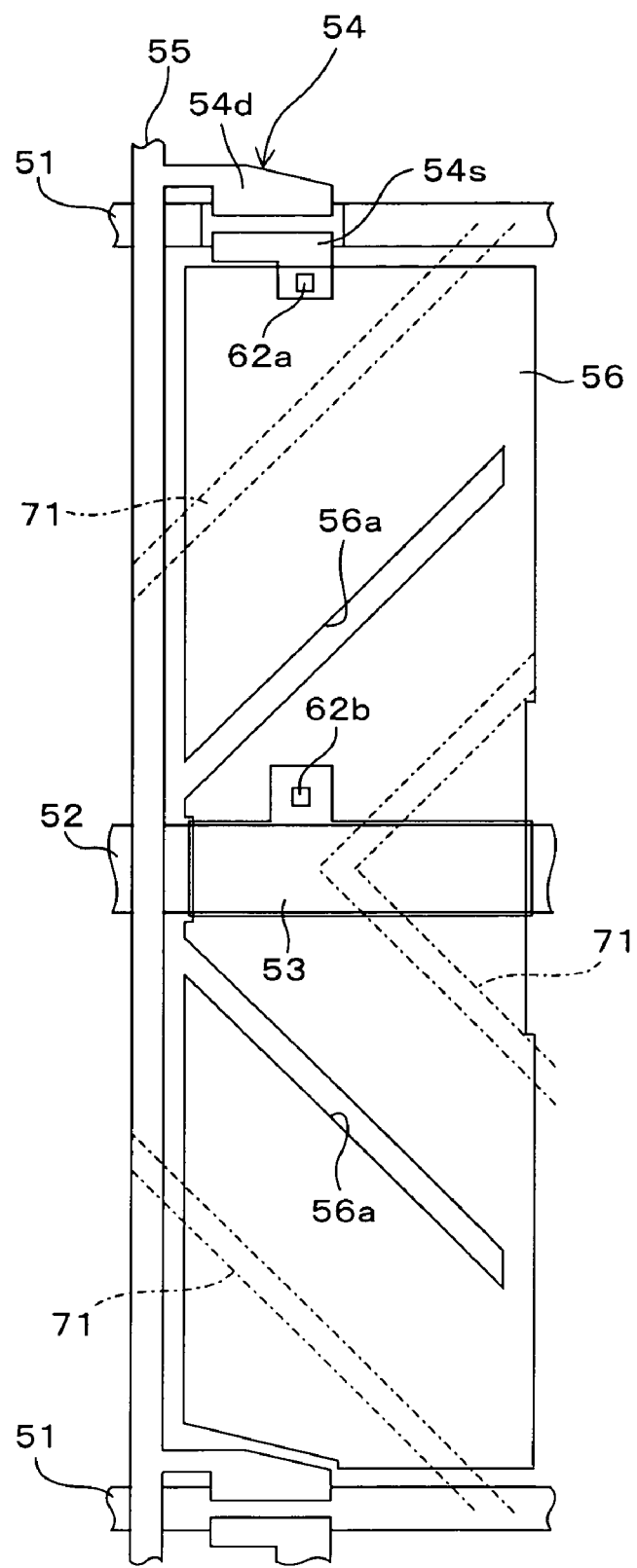
FIG. 4 is a plan view showing one picture element region of a conventional MVA liquid crystal display device.
Figure 5:
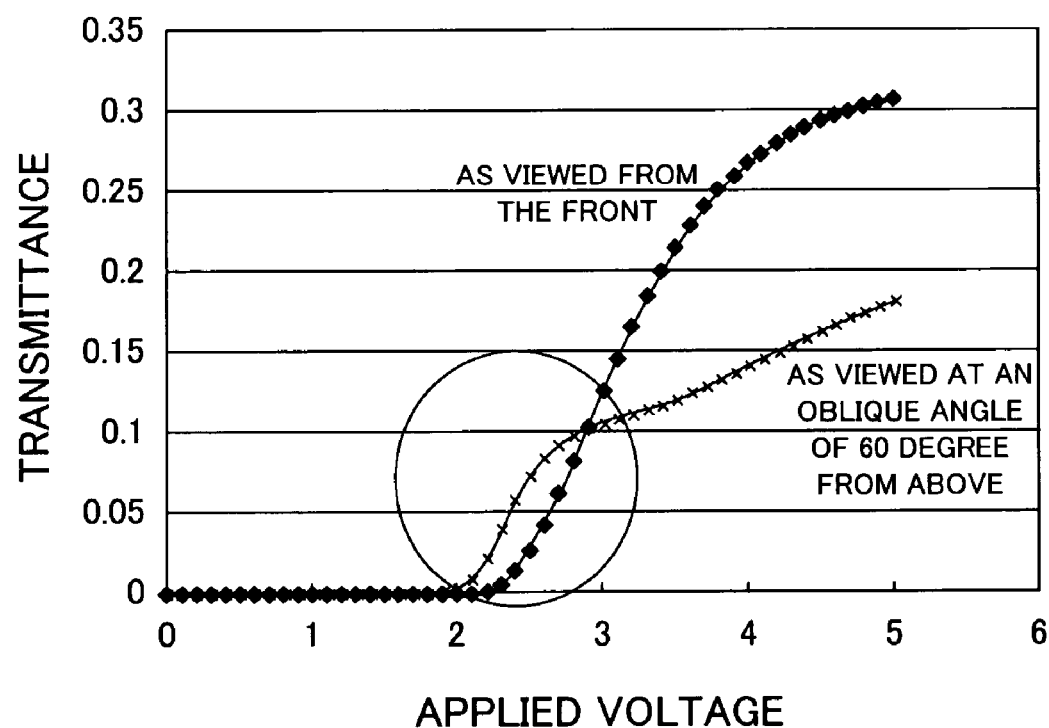
FIG. 5 is a plot showing the transmittance (T) versus applied voltage (V) characteristics of a screen as viewed from the front and as viewed at an oblique angle of 60 degrees from above.
Figure 6:
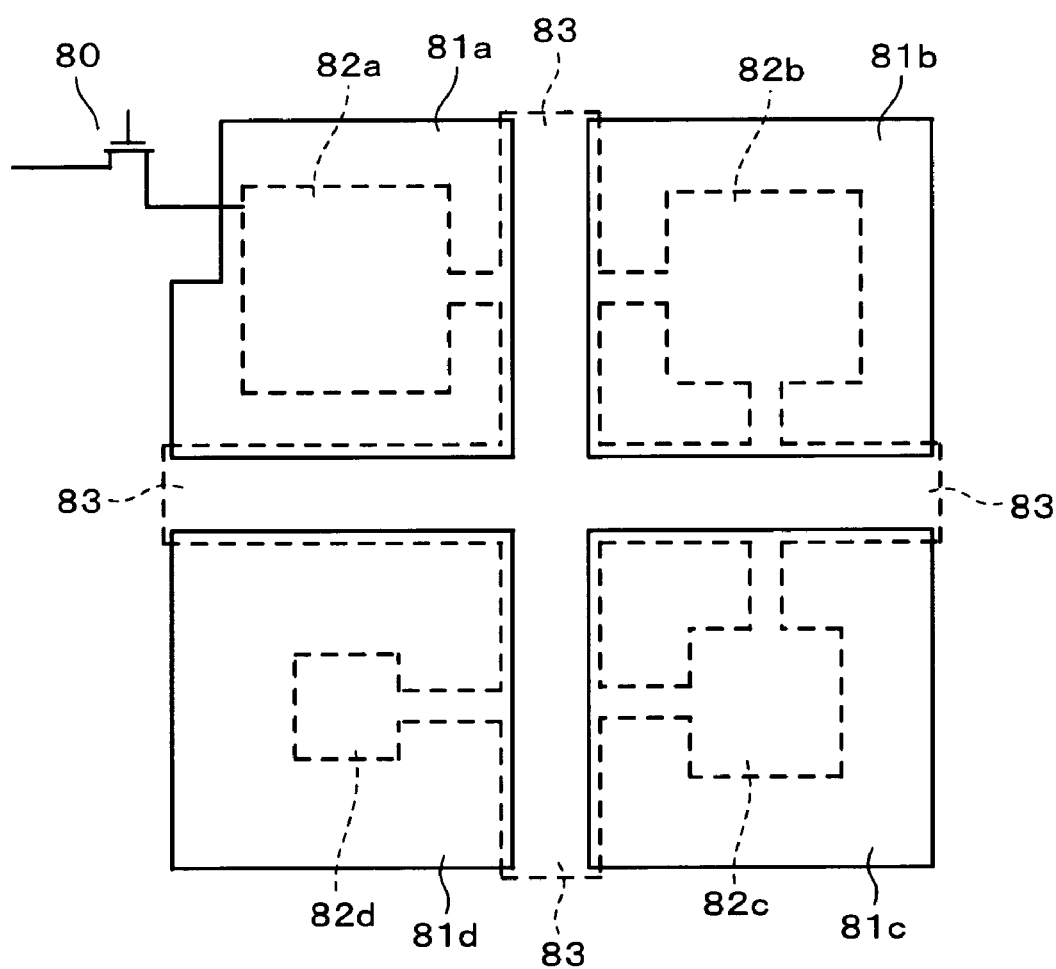
FIG. 6 is a plan view showing an example of the conventional liquid crystal display device in which each picture element is subdivided into a plurality of sub picture elements.
Figure 7A:
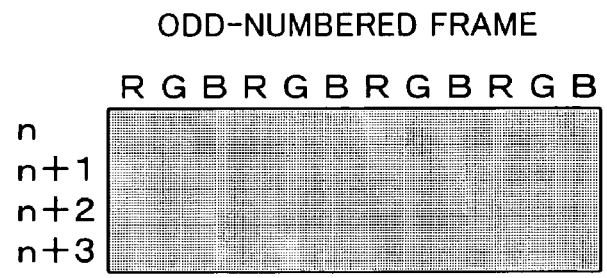
FIGS. 7A and 7B are illustrations showing an example of a conventional method of driving a liquid crystal display device.
Figure 7B:
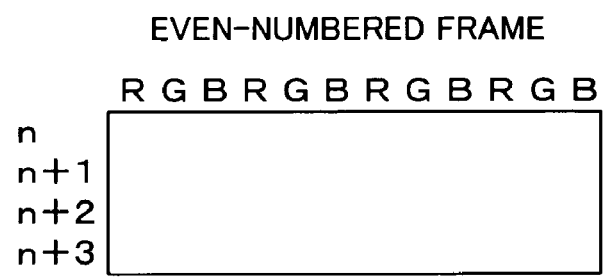
Figure 8A:
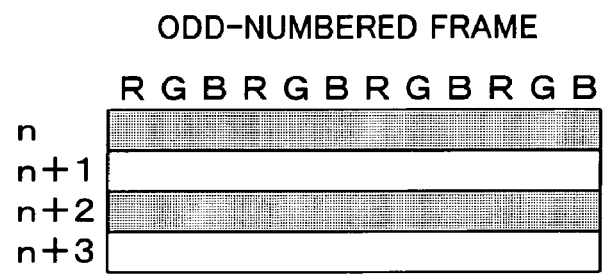
FIGS. 8A and 8B are illustrations showing another example of the conventional method of driving a liquid crystal display device.
Figure 8B:
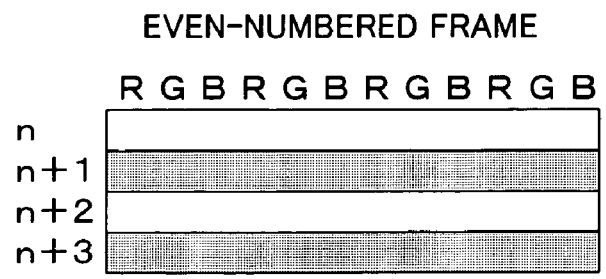
Figure 10:
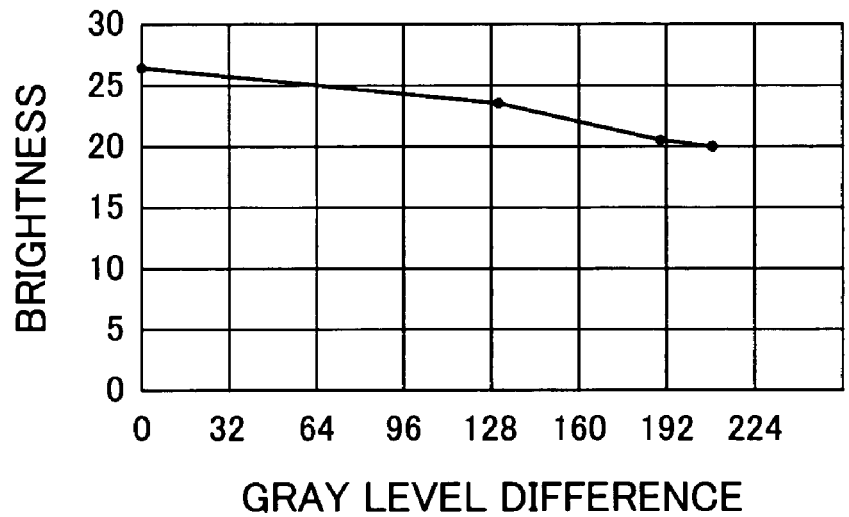
FIG. 10 is a plot showing the relation between a gray level difference between voltages V1 and V2 for halftone display and brightness as viewed from any oblique angle.
Figure 11:
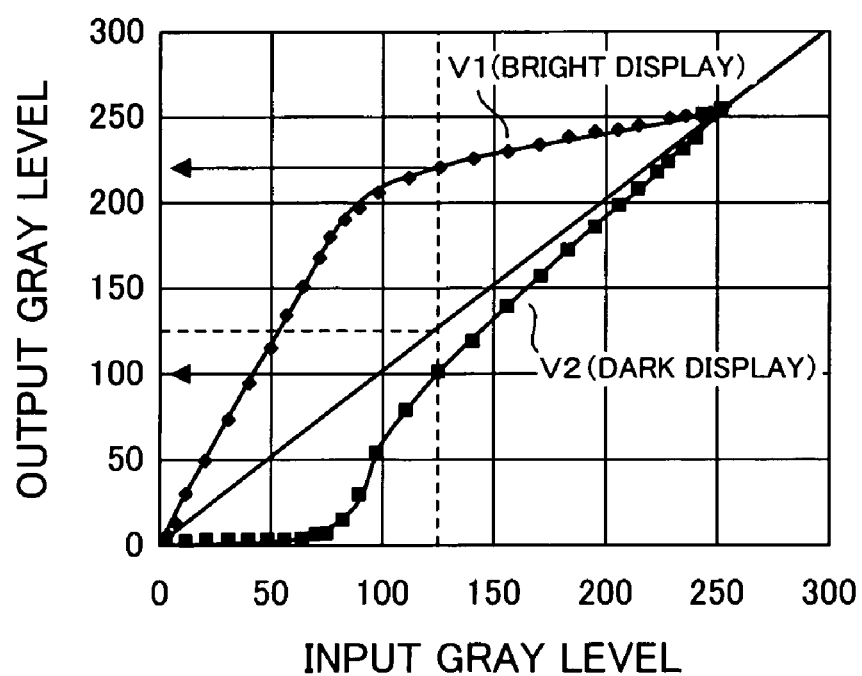
FIG. 11 is a plot showing the input gray level versus output gray level characteristics of the voltages V1 and V2 required to obtain desired brightness.
Figure 13A:
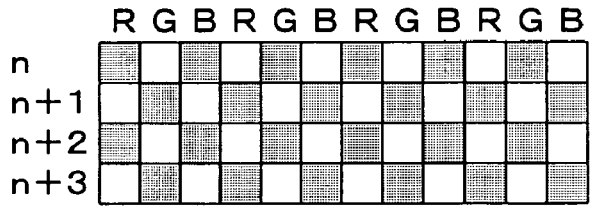
FIGS. 13A to 13F are illustrations showing a further example of the conventional method of driving a liquid crystal display device.
Figure 13B:
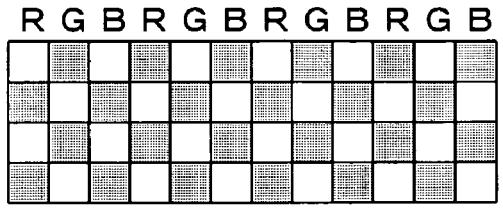
Figure 13C:
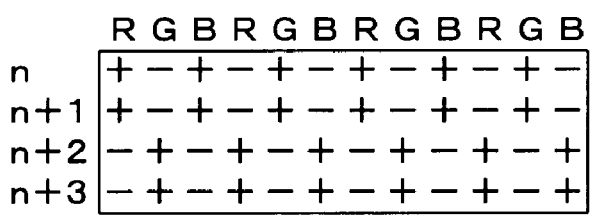
Figure 13D:
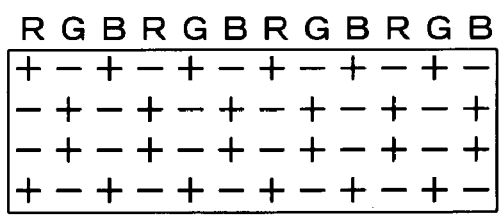
Figure 13E:
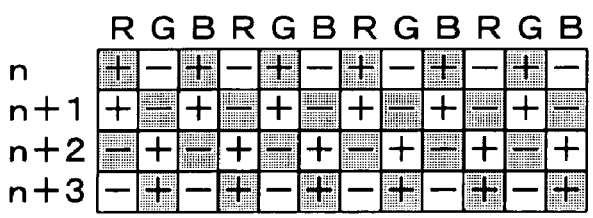
Figure 13F:
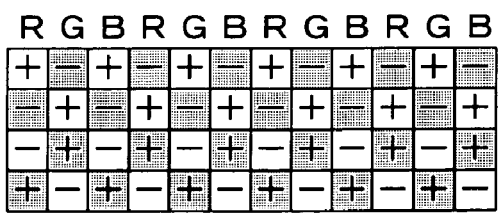

Furthermore, a large gray level difference between bright display picture elements and dark display picture elements can be set (see FIG. 11). This allows improving viewing angle characteristics, thus preventing the occurrence of a phenomenon in which the screen becomes whitish when viewed from any oblique angle (i.e., washing out).

[First Modified Embodiment]

A driver IC (integrated circuit), which is adapted to reverse the polarity every two data bus lines 118, is necessary in order to implement a driving method as shown in FIGS. 20A to 20D. However, almost all of driver ICs in current use are adapted either to apply voltages of opposite polarities to adjacent data bus lines or to apply a voltage of the same polarity to all data bus lines. A driver IC may be newly designed to generate the polarity patterns as shown in FIGS. 20A to 20D. In this case, the driver IC, however, cannot be used for general purposes, and thus leads to a rise in the cost of manufacturing the liquid crystal display device.

Figure 21:
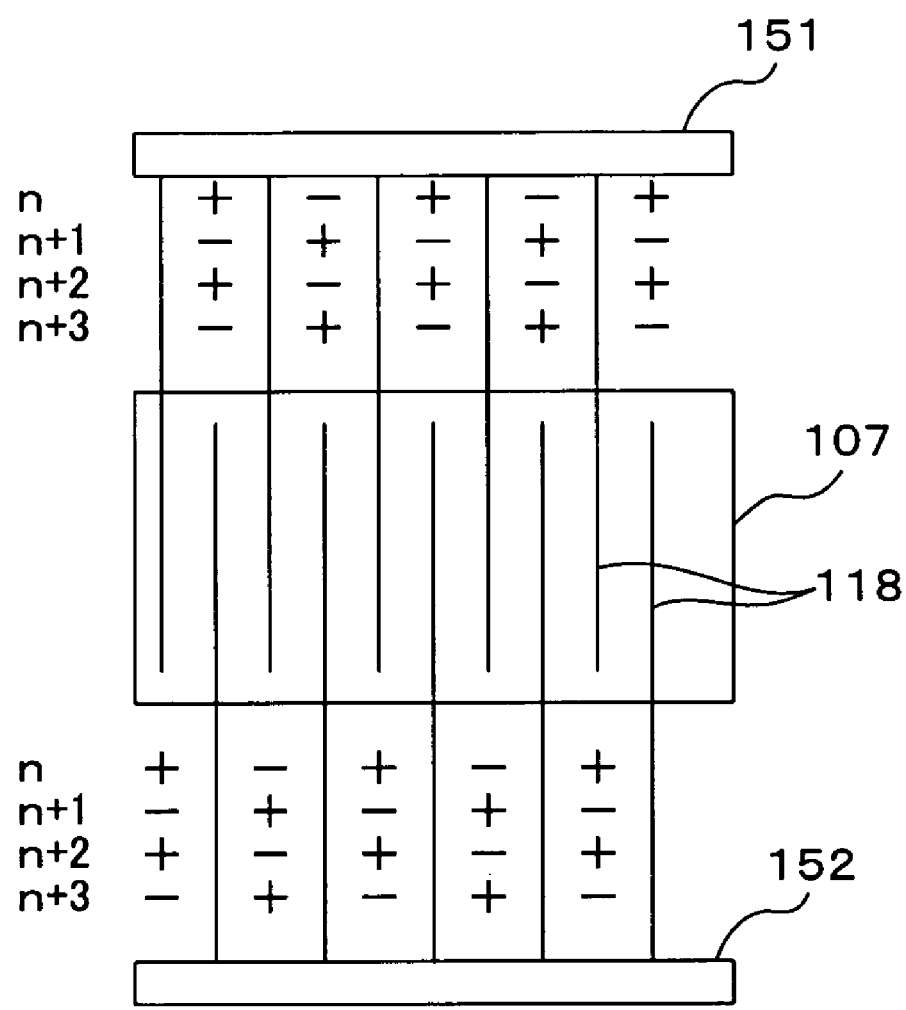
FIG. 21 is a schematic illustration showing a liquid crystal display device of a first modified embodiment.

A first modified embodiment uses a general-purpose driver IC which is conventionally used. Specifically, driver ICs 151 and 152 are disposed over and under the liquid crystal display panel 107, respectively, as shown in FIG. 21. The upper driver IC 151 is used to drive odd-numbered data bus lines 118, and the lower driver IC 152 is used to drive even-numbered data bus lines 118. The driver ICs 151 and 152 are used to generate the bright and dark display patterns and the polarity patterns as shown in FIGS. 20A to 20D, which are used to drive the liquid crystal display panel 107.

This permits the use of any currently available general-purpose driver IC, thus avoiding a rise in the cost of manufacturing the liquid crystal display device.

Second Modified Embodiment

Figure 22:
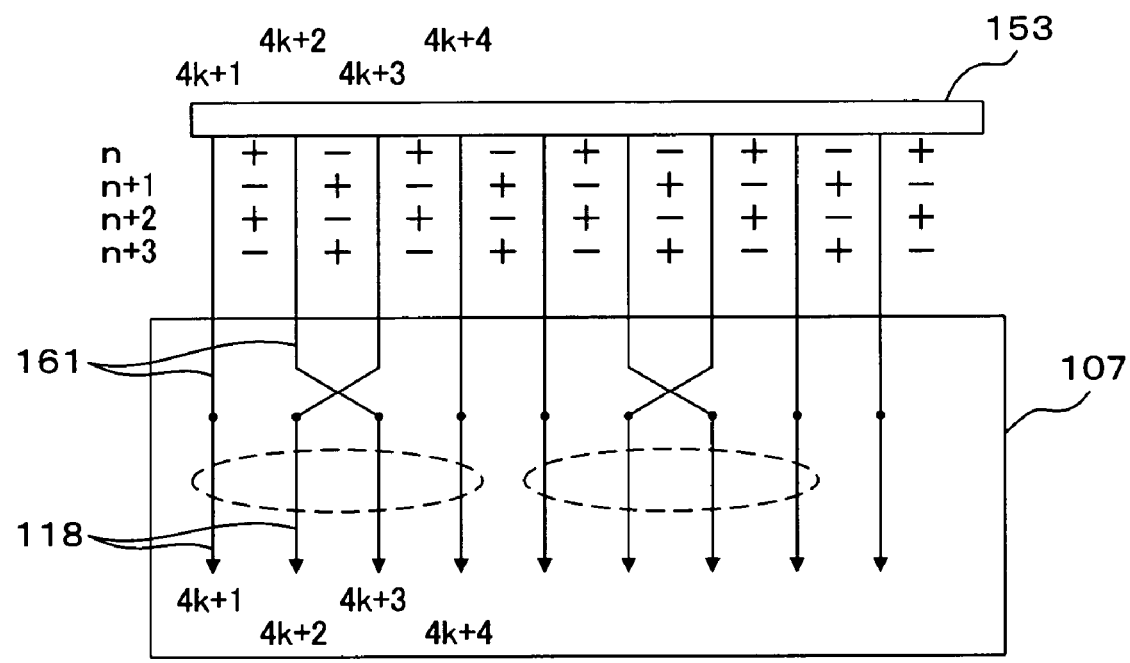
FIG. 22 is a schematic illustration showing a liquid crystal display device of a second modified embodiment.

FIG. 22 is a schematic illustration showing a liquid crystal display device according to a second modified embodiment. In the second modified embodiment, a general-purpose driver IC 153 is also used. In the second modified embodiment, the horizontally arranged data bus lines 118 are divided into groups of four, starting at the leftmost end. The second ((4k+2)th) data bus line 118 from the left, which belongs to each group, crosses and is connected to the third ((4k+3)th) metal wiring 161 (where k denotes any natural number including 0). More specifically, the (4k+1)th, (4k+2)th, (4k+3)th, and (4k+4)th metal wirings 161 are connected to the (4k+1)th, (4k+3)th, (4k+2)th, and (4k+4)th data bus lines 118, respectively. When the metal wirings arranged in sequence are connected to the data bus lines arranged in sequence, the metal wiring and the data bus line having different numbers are connected as mentioned above. Hereinafter, this connection is referred to as "wiring replacement".

Thus, any general-purpose driver IC which is commercially available at present can be used to generate the bright and dark display patterns with transverse 1-dot inversion and longitudinal 1-dot inversion and the polarity patterns with transverse 2-dot inversion and longitudinal 2-dot inversion as shown in FIGS. 20A to 20D, which are used to drive the liquid crystal display panel 107.

Figure 23A:
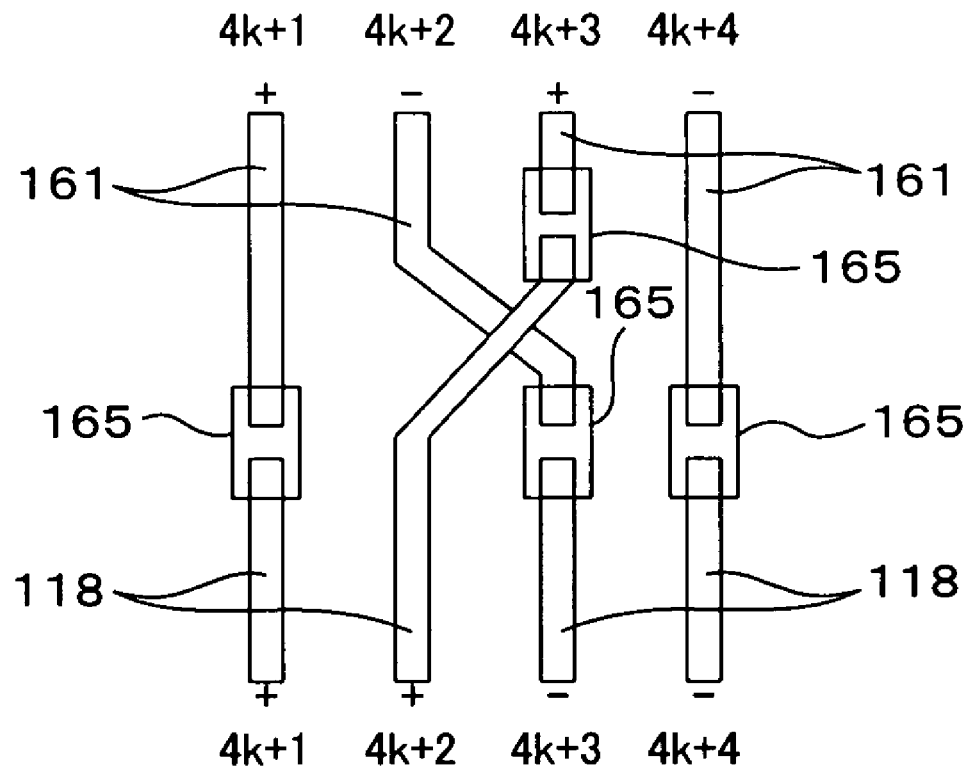
FIGS. 23A and 23B are a plan view and a schematic cross-sectional view, respectively, showing an example of connections between metal wirings and data bus lines.
Figure 23B:
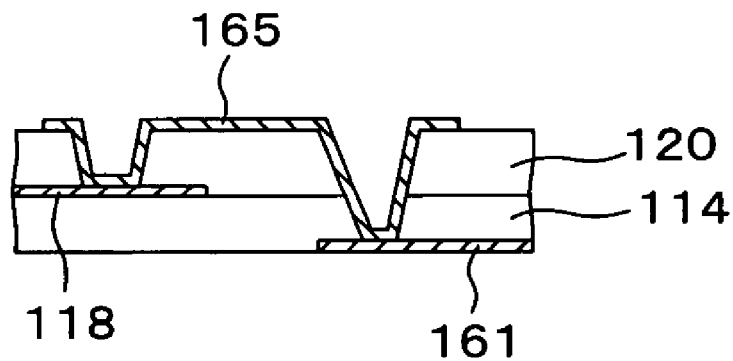

FIGS. 23A and 23B are a plan view and a schematic cross-sectional view, respectively, showing an example of connections between the wirings and the data bus lines close to the driver IC. In this example, the metal wiring 161 connected to an output terminal of the driver IC is formed in the same layer (i.e., the first metal film) as the gate bus line 112. ITO wirings 165, which are formed simultaneously with the picture element electrode, are used to electrically connect the (4k+1)th, (4k+2)th, (4k+3)th, and (4k+4)th metal wirings 161 to the (4k+1)th, (4k+3)th, (4k+2)th, and (4k+4)th data bus lines 118, respectively. In this case, as shown in FIG. 23A, the (4k+2)th metal wiring 161 and the (4k+2)th data bus line 118 cross each other when viewed from above.

Figure 24A:
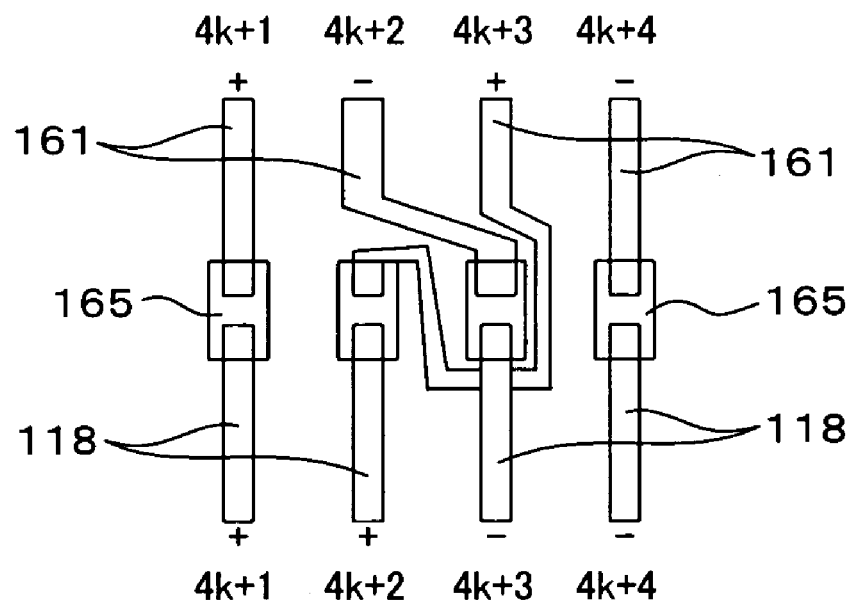
FIGS. 24A and 24B are plan views showing another example and still another example, respectively, of connections between the metal wirings and the data bus lines.

FIG. 24A is a plan view showing another example of connections between the metal wirings 161 and the data bus lines 118. In this example, the ITO wirings 165 are arranged horizontally. The (4k+2)th metal wiring 161 close to the driver IC is connected to the (4k+3)th ITO wiring 165. The (4k+3)th metal wiring 161 goes around the (4k+3)th ITO wiring 165, passes under the end of the (4k+3)th data bus line 118, and is connected to the (4k+2)th ITO wiring 165.

Figure 24B:
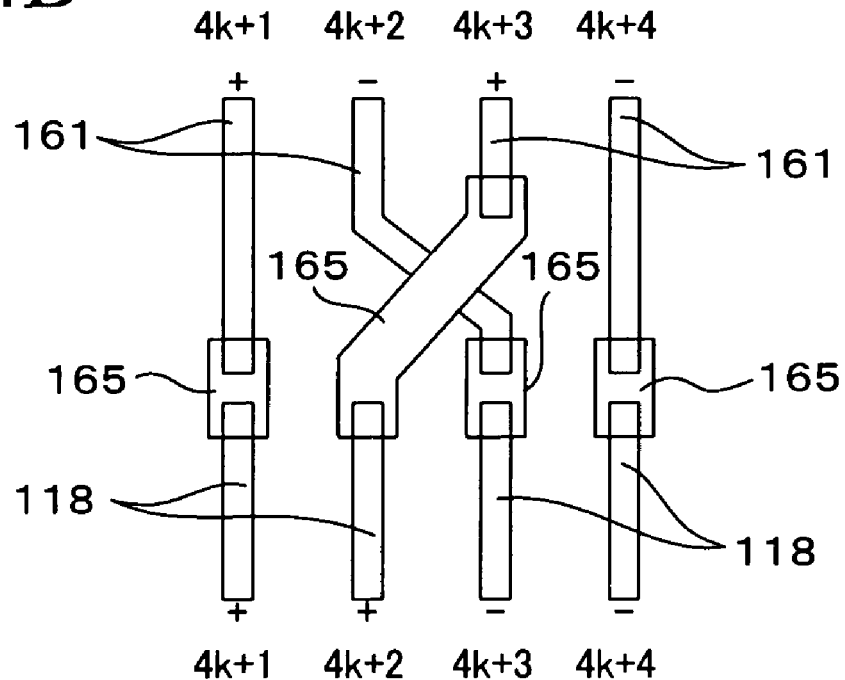

FIG. 24B is a plan view showing still another example of connections between the metal wirings 161 and the data bus lines 118. In this example, the ITO wiring 165, which connects the (4k+3)th metal wiring 161 to the (4k+2)th data bus line 118, extends obliquely. The (4k+2)th metal wiring 161 passes under this ITO wiring 165 and is connected to the (4k+3)th data bus line 118.

FIGS. 23A and 23B and FIGS. 24A and 24B show the examples in which the metal wirings 161 and the ITO wirings 165 formed on the TFT substrate are used for wiring replacement. However, a flexible printed wiring board, which connects the driver IC to the liquid crystal display panel 107, may be used for wiring replacement.

When wiring replacement takes place as described above, the original signal order is different from the signal order in the liquid crystal display panel. For instance, the driver IC is used to perform replacement of display signals therein, thereby enabling excellent display. For example, when data of three RGB picture elements is received in one clock, data of twelve picture elements is inputted in four clocks. In this case, there is a need for the replacement process which involves replacing the second and third display signals with each other, replacing the sixth and seventh display signals with each other, and replacing the tenth and eleventh display signals with each other, as given below.

RGB, RGB, RGB, RGB, . . .

RBG, RGR, BGB, GRB, . . .

Figure 25A:
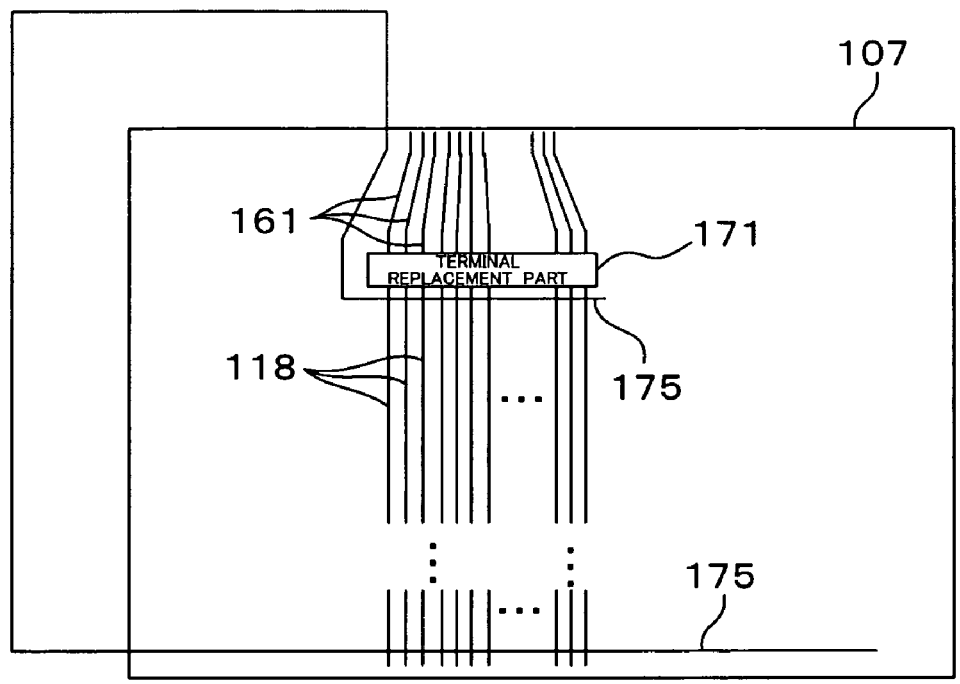
FIGS. 25A and 25B are schematic illustrations showing the position of a terminal replacement part in a liquid crystal display device having repair wirings.
Figure 25B:
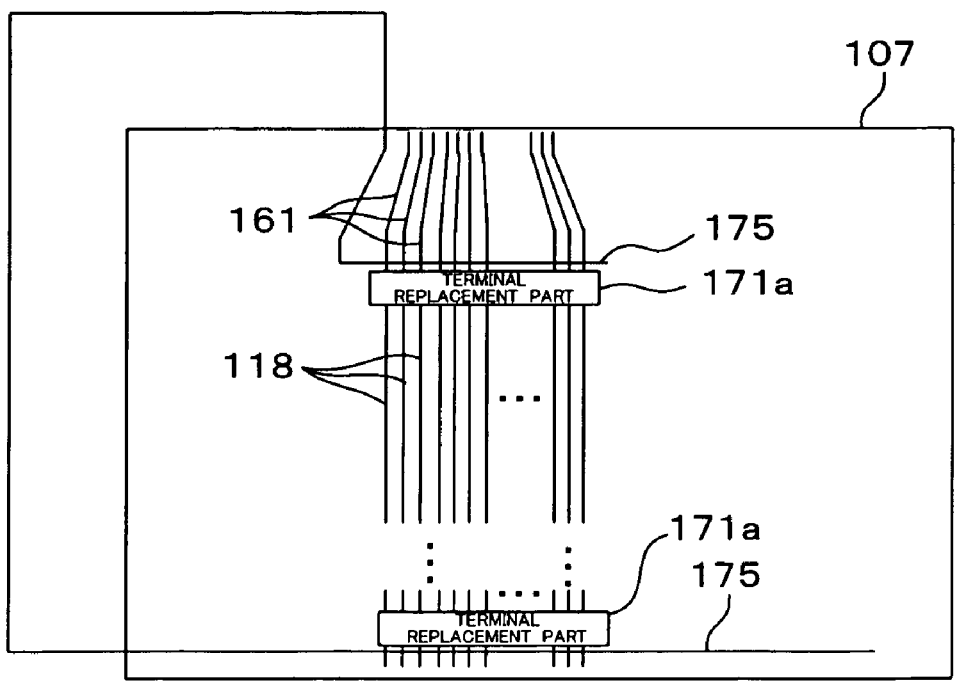

Typically, the liquid crystal display panel is provided with repair wirings which can provide connection between the upper and lower portions of the data bus line in order to remedy the panel when trouble such as disconnection occurs in the data bus line. In the liquid crystal display panel including the repair wirings, it is preferable that a terminal replacement part 171 be disposed in a region close to the driver IC (e.g., on the upper side in FIG. 25A) rather than a repair wiring 175, as schematically shown in FIG. 25A. When the terminal replacement parts are disposed between the repair wirings and a display part, it is preferable that the terminal replacement parts 171 be located between the upper repair wiring 175 and the display part and between the lower repair wiring 175 and the display part, as schematically shown in FIG. 25B. This facilitates the correspondence between the upper and lower repair parts.

What is claimed is:

1. A method of driving a liquid crystal display device including a plurality of picture elements arranged in horizontal and vertical directions, and a display signal feeding part which receives input of a video signal and feeds a display signal to each of the plurality of picture elements,
   wherein the display signal feeding part determines the gray level and polarity of a display signal to be fed to each picture element in accordance with a bright and dark display pattern and a polarity pattern; the bright and dark display pattern indicates the arrangement corresponding to one frame of bright display picture elements, each of which undergoes bright display through a supply of a first display signal having a higher gray level than a gray level of the video signal, and dark display picture elements, each of which undergoes dark display through a supply of a second display signal having a lower gray level than the gray level of the video signal; and the polarity pattern indicates the arrangement corresponding to one frame of positive-polarity picture elements, each of which receives the supply of a display signal of positive polarity, and negative-polarity picture elements, each of which receives the supply of a display signal of negative polarity;
   in the bright and dark display pattern, the bright display picture elements and the dark display picture elements alternate with each other every one picture element in the horizontal and vertical directions;
   in the polarity pattern, the positive-polarity picture elements and the negative-polarity picture elements alternate with each other every two picture elements in the horizontal and vertical directions; and
   wherein, in the polarity pattern, each group of four adjacent picture elements of said plurality of picture elements consists of any one of the following configurations:
      four of said positive-polarity picture elements,
      four of said negative-polarity picture elements, or
      a combination of two of said positive-polarity picture elements and two of said negative-polarity picture elements.

2. The method of driving a liquid crystal display device according to claim 1, wherein the bright display picture elements and the dark display picture elements are replaced with each other for each frame.

3. The method of driving a liquid crystal display device according to claim 1, wherein a display state is changed in a predetermined sequence every (2×n) frames so that each of the plurality of picture elements enters four states: positive-polarity bright display, positive-polarity dark display, negative-polarity bright display, and negative-polarity dark display (where n denotes any integer exceeding 0(n >0)).

4. The method of driving a liquid crystal display device according to claim 1, wherein a difference between the gray level of the first display signal and the gray level of the second display signal is determined according to the gray level of the video signal.

5. The method of driving a liquid crystal display device according to claim 1, wherein the picture elements comprise a picture element electrode, an opposite electrode, and vertical alignment liquid crystal between the picture element electrode and the opposite electrode.

6. The method of driving a liquid crystal display device according to claim 1, wherein the bright and dark display pattern and the polarity pattern are changed each frame of a cycle having four frames.

7. The method of driving a liquid crystal display device according to claim 1, wherein the positive-polarity picture elements and the negative-polarity picture elements of only even-numbered gate bus lines or only odd-numbered gate bus lines are replaced with each other for each frame.

8. A method of driving a liquid crystal display device including a plurality of picture elements arranged in horizontal and vertical directions, and a display signal feeding pan which receives input of a video signal and feeds a display signal to each of the plurality of picture elements,
   wherein the display signal feeding part determines the gray level and polarity of a display signal to be fed to each picture element in accordance with a bright and dark display pattern and a polarity pattern; the bright and dark display pattern indicates the arrangement corresponding to one frame of bright display picture elements, each of which undergoes bright display through a supply of a first display signal having a higher gray level than a gray level of the video signal, and dark display picture elements, each of which undergoes dark display through a supply of a second display signal having a lower gray level than the gray level of the video signal; and the polarity pattern indicates the arrangement corresponding to one frame of positive-polarity picture elements, each of which receives the supply of a display signal of positive polarity, and negative-polarity picture elements, each of which receives the supply of a display signal of negative polarity;
   in the bright and dark display pattern, the bright display picture elements and the dark display picture elements alternate with each other every one picture element in the horizontal and vertical directions; and
   in the polarity pattern, the positive-polarity picture elements and the negative-polarity picture elements alternate with each other every two picture elements in the horizontal and vertical directions,
   wherein half of the positive-polarity picture elements and half of the negative-polarity picture elements are replaced with each other for each frame.

9. A liquid crystal display device comprising:
   a liquid crystal display panel having an arrangement of a plurality of picture elements;
   a plurality of gate bus lines and a plurality of data bus lines, which are disposed on the liquid crystal display panel and are connected to the picture elements;
   a display controller which receives input of a video signal and outputs a display signal;
   a gate driver which feeds a scan signal to the plurality of gate bus lines in sequence;
   a first data driver which feeds a display signal to odd-numbered data bus lines; and
   a second data driver which feeds a display signal to even-numbered data bus lines;
   wherein the display controller feeds display signals, which have different polarities, every two picture elements in one frame and have different gray levels every one picture element in the one frame, to the plurality of picture elements through the first and second data drivers.

10. The liquid crystal display device according to claim 9, wherein one of display signals, which are fed to picture elements located horizontally and vertically adjacent to each other, has a higher gray level than the gray level of the video signal, and the other display signal has a lower gray level than the gray level of the video signal.

11. The liquid crystal display device according to claim 9, wherein the picture elements each comprise a picture element electrode, an opposite electrode, and vertical alignment liquid crystal between the picture element electrode and the opposite electrode.

12. The liquid crystal display device according to claim 9, wherein the first and second data drivers are located with a display part of the liquid crystal display panel therebetween.

13. A liquid crystal display device comprising:
   a liquid crystal display panel having an arrangement of a plurality of picture elements;
   a plurality of gate bus lines and a plurality of data bus lines, which are disposed on the liquid crystal display panel and are connected to the picture elements;
   a display controller which receives input of a video signal and outputs a display signal;
   a gate driver which feeds a scan signal to the plurality of gate bus lines in sequence;
   a data driver which feeds a display signal to the plurality of data bus lines; and
   a wiring replacement part which feeds signals, which are outputted through (4k+1)th, (4k+2)th, (4k+3)th, and (4k+4)th output terminals of the data driver, to (4k+1)th, (4k+3)th, (4k+2)th, and (4k+4)th data bus lines, respectively (where k denotes any natural number including 0).

14. The liquid crystal display device according to claim 13, wherein a wiring connected to the output terminal of the data driver is formed in the same layer as the gate bus line, and the wiring replacement part is made of a transparent conductor wiring formed in the same layer as a picture element electrode of the picture element.

15. The liquid crystal display device according to claim 13 including a repair wiring which can provide electrical connection between both ends of the data bus line, wherein the wiring replacement part is disposed between the output terminal of the data driver and the repair wiring.

16. The liquid crystal display device according to claim 13, wherein the picture elements each comprise a picture element electrode, an opposite electrode, and vertical alignment liquid crystal between the picture element electrode and the opposite electrode.

* * * * *

UNITED STATES PATENT AND TRADEMARK OFFICE
CERTIFICATE OF CORRECTION

| | |
|---|---|
| PATENT NO. | : 7,605,788 B2 |
| APPLICATION NO. | : 11/070122 |
| DATED | : October 20, 2009 |
| INVENTOR(S) | : Kamada et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this

Fifth Day of October, 2010

David J. Kappos
*Director of the United States Patent and Trademark Office*